United States Patent
Zhang et al.

(10) Patent No.: US 10,901,185 B2
(45) Date of Patent: Jan. 26, 2021

(54) OPTICAL IMAGING SYSTEM

(71) Applicant: ZHEJIANG SUNNY OPTICAL CO., LTD., Ningbo (CN)

(72) Inventors: Kaiyuan Zhang, Ningbo (CN); Yuanlin Jia, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 128 days.

(21) Appl. No.: 16/226,205

(22) Filed: Dec. 19, 2018

(65) Prior Publication Data

US 2019/0154993 A1 May 23, 2019

Related U.S. Application Data

(63) Continuation of application No. PCT/CN2018/077207, filed on Feb. 26, 2018.

(30) Foreign Application Priority Data

Jun. 28, 2017 (CN) .......................... 2017 1 0506294
Jun. 28, 2017 (CN) .......................... 2017 2 0763034

(51) Int. Cl.
*G02B 9/62* (2006.01)
*G02B 13/18* (2006.01)
*G02B 13/00* (2006.01)
*G02B 13/04* (2006.01)

(52) U.S. Cl.
CPC ............ *G02B 13/0045* (2013.01); *G02B 9/62* (2013.01); *G02B 13/04* (2013.01)

(58) Field of Classification Search
CPC ....... G02B 13/0045; G02B 9/62; G02B 13/04
USPC .................. 359/713, 752, 756, 761
See application file for complete search history.

(56) References Cited

U.S. PATENT DOCUMENTS

| | | | |
|---|---|---|---|
| 8,780,465 | B2 | 7/2014 | Chae |
| 8,786,966 | B2 | 7/2014 | You |
| 9,383,554 | B2 | 7/2016 | Chae |
| 9,523,839 | B2 | 12/2016 | You |
| 9,851,539 | B2 | 12/2017 | You |
| 9,910,249 | B2 | 3/2018 | Chae |
| 2013/0088788 | A1 | 4/2013 | You |
| 2013/0286488 | A1 | 10/2013 | Chae |

(Continued)

FOREIGN PATENT DOCUMENTS

| | | |
|---|---|---|
| CN | 105204143 A | 12/2015 |
| CN | 105572850 A | 5/2016 |

(Continued)

OTHER PUBLICATIONS

PCT International Search Report and Written Opinion completed by the ISA/CN on May 4, 2018 and issued in connection with PCT/CN2018/077207.

*Primary Examiner* — William Choi
(74) *Attorney, Agent, or Firm* — Barnes & Thornburg LLP

(57) ABSTRACT

The present disclosure discloses an optical imaging system. The optical imaging system includes, sequentially along an optical axis from an object side to an image side, a first lens, a second lens, a third lens, a fourth lens, a fifth lens, and a sixth lens. Each of the first lens and the fourth lens may have a negative refractive power. Each of the second lens and the sixth lens may have a positive refractive power or a negative refractive power. An effective focal length f3 of the third lens and an effective focal length f5 of the fifth lens may satisfy: $0 < f3/f5 < 0.8$.

18 Claims, 12 Drawing Sheets

(56) References Cited

U.S. PATENT DOCUMENTS

| | | | |
|---|---|---|---|
| 2014/0104704 A1 | 4/2014 | Chae | |
| 2014/0104709 A1 | 4/2014 | You | |
| 2014/0111874 A1 | 4/2014 | Chae | |
| 2014/0368929 A1 | 12/2014 | Chae | |
| 2014/0368932 A1 | 12/2014 | You | |
| 2015/0309288 A1 | 10/2015 | Chae | |
| 2015/0346459 A1* | 12/2015 | Chen | G02B 13/0045 348/335 |
| 2016/0370561 A1 | 12/2016 | You | |
| 2017/0227741 A1 | 8/2017 | Dai et al. | |
| 2018/0095250 A1 | 4/2018 | You | |

FOREIGN PATENT DOCUMENTS

| | | |
|---|---|---|
| CN | 105892020 A | 8/2016 |
| CN | 105988192 A | 10/2016 |
| CN | 106019535 A | 10/2016 |
| CN | 105204144 B | 5/2017 |
| CN | 106646835 A | 5/2017 |
| CN | 107121756 A | 9/2017 |
| CN | 206960762 U | 2/2018 |
| JP | 2007279555 A | 10/2007 |
| JP | 2016188893 A | 11/2016 |
| JP | 2017517756 A | 6/2017 |
| JP | 6205051 B2 | 9/2017 |
| KR | 20130038631 A | 4/2013 |
| KR | 101301314 B1 | 8/2013 |
| KR | 20130122352 A | 11/2013 |
| KR | 101422910 B1 | 7/2014 |
| WO | 2015040808 A1 | 3/2015 |
| WO | 20160179986 A1 | 11/2016 |
| WO | 2018010246 A1 | 1/2018 |

* cited by examiner

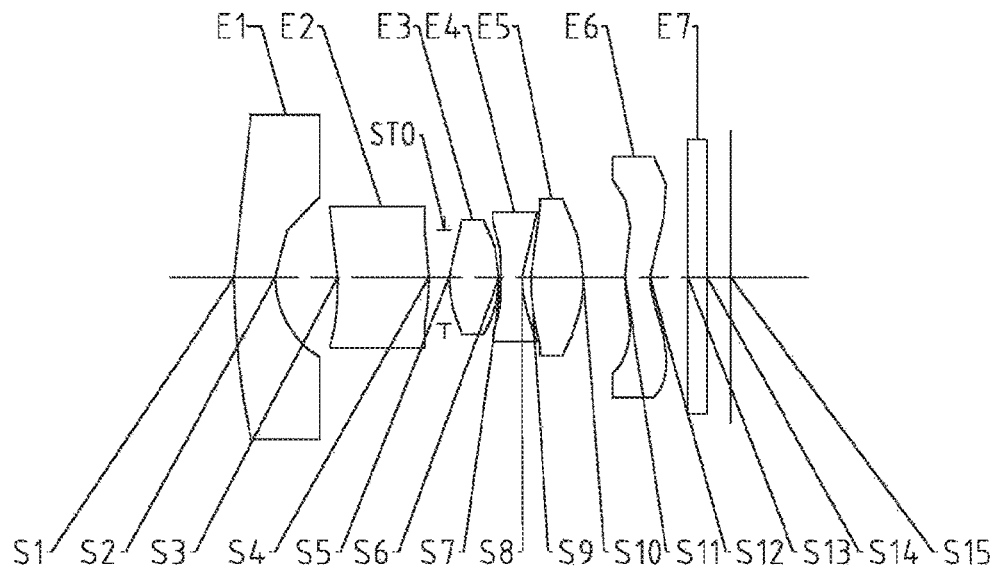
Fig. 9
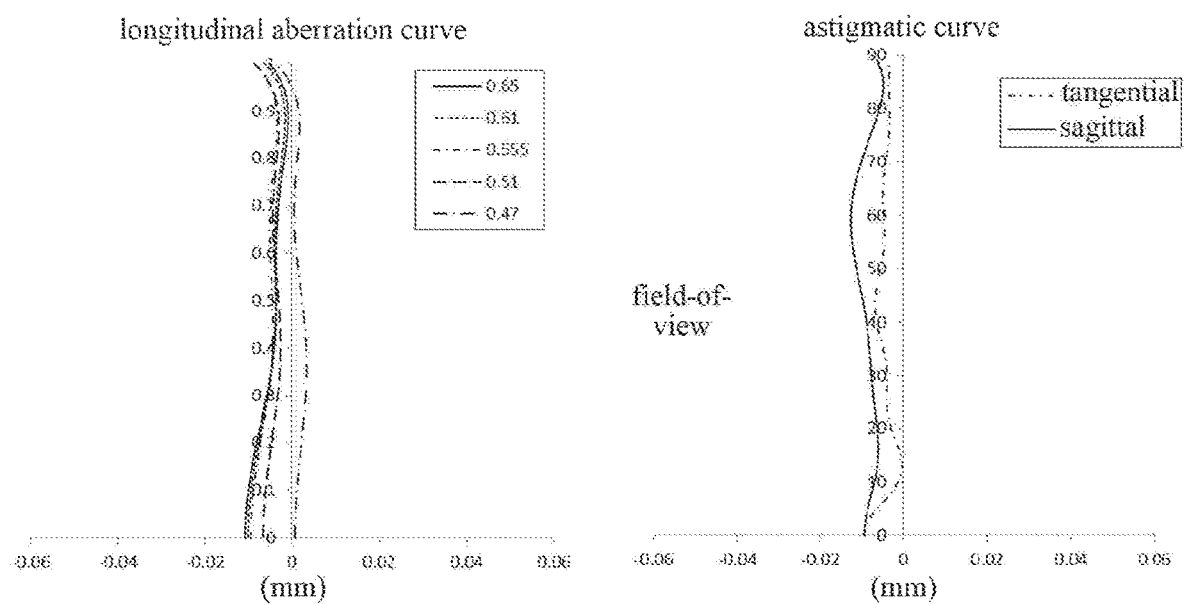
Fig. 10A
Fig. 10B

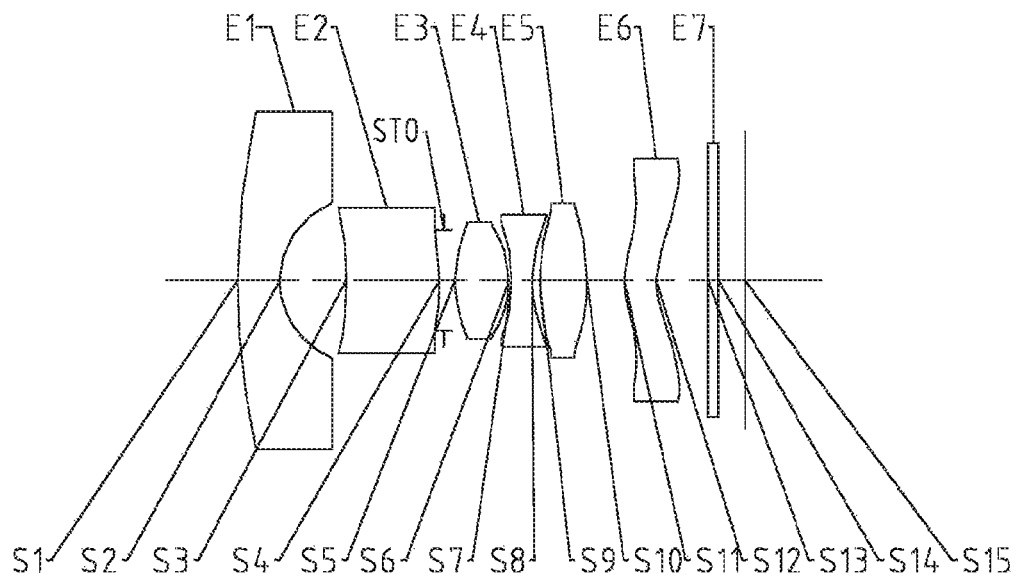
Fig. 13
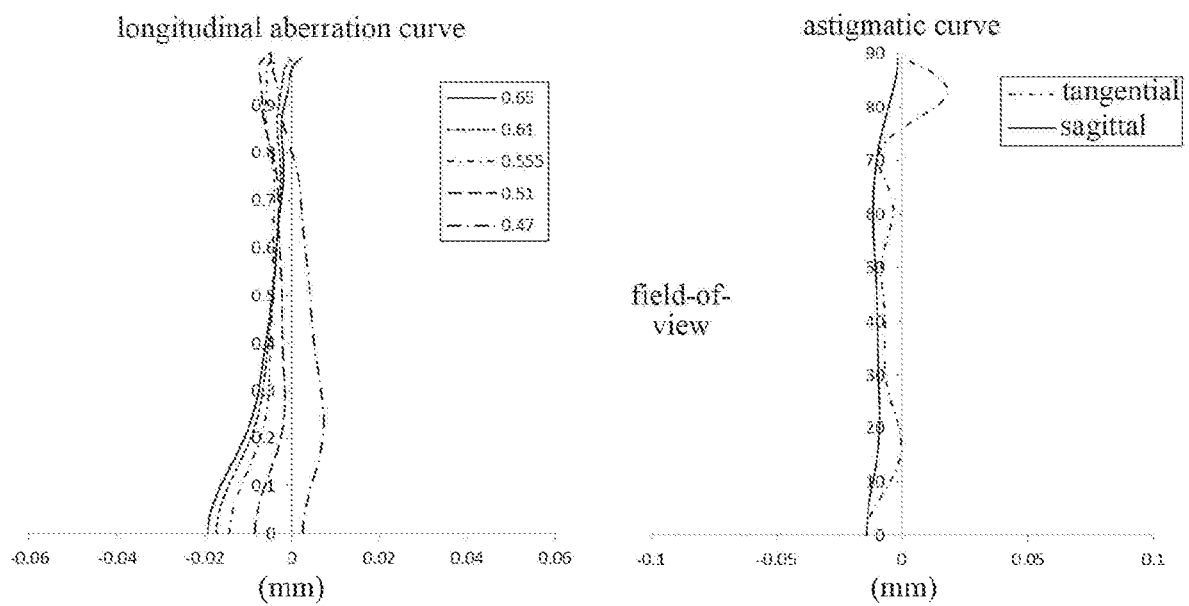
Fig. 14A                    Fig. 14B

OPTICAL IMAGING SYSTEM

CROSS-REFERENCE TO RELATED APPLICATIONS

This application is a continuation of International Application No. PCT/CN2018/077207, filed on Feb. 26, 2018, which claims the priorities and rights to Chinese Patent Application No. 201710506294.9 and Chinese Patent Application No. 201720763034.5 filed with China National Intellectual Property Administration (CNIPA) on Jun. 28, 2017. All of the aforementioned applications are hereby incorporated by reference in their entireties.

TECHNICAL FIELD

The present disclosure relates to an optical imaging system, and more specifically to a wide-angle imaging system including six lenses.

BACKGROUND

At present, in addition to high resolution, higher requirements on the range of field-of-view of an optical imaging system have also been brought fordward. Since an optical imaging system having a large field-of-view can contain more information about the object during imaging, an imaging lens assembly having a large field has become a trend.

Meanwhile, the increasing development of the portable electronic products brings fordward corresponding requirements on miniaturization and light-weight of the lens assembly. Therefore, under the premise of satisfying the miniaturization and the light-weight of the lens assembly, the lens assembly needs to possess performances of ultra-wide-angle, high resolution, high image quality, etc.

SUMMARY

The present disclosure provides an optical imaging system which may be applicable to portable electronic products and may at least or partially solve at least one of the above disadvantages in the existing technology.

According to an aspect, the present disclosure provides an optical imaging system. The optical imaging system includes, sequentially along an optical axis from an object side to an image side, a first lens, a second lens, a third lens, a fourth lens, a fifth lens, and a sixth lens. Each of the first lens and the fourth lens may have a negative refractive power. Each of the second lens and the sixth lens may have a positive refractive power or a negative refractive power. An effective focal length f3 of the third lens and an effective focal length f5 of the fifth lens may satisfy: 0<f3/f5<0.8.

According to another aspect, the present disclosure provides an optical imaging system having a total effective focal length f, and the optical imaging system includes, sequentially along an optical axis from an object side to an image side, a first lens, a second lens, a third lens, a fourth lens, a fifth lens, and a sixth lens. The first lens may have a negative refractive power. Each of the second lens and the sixth lens may have a positive refractive power or a negative refractive power. A combined refractive power of the third lens, the fourth lens and the fifth lens may be a positive refractive power. At least one of the third lens, the fourth lens or the fifth lens may have a negative refractive power. A combined focal length f345 of the third lens, the fourth lens, and the fifth lens may satisfy: 0.5<f/f345<0.9.

According to another aspect, the present disclosure further provides an optical imaging system. The optical imaging system includes, sequentially along an optical axis from an object side to an image side, a first lens, a second lens, a third lens, a fourth lens, a fifth lens, and a sixth lens. Each of the first lens and the fourth lens may have a negative refractive power. Each of the third lens and the fifth lens may have a positive refractive power. At least one of the second lens or the sixth lens may have a positive refractive power. A sagittal height SAG61 of an object-side surface of the sixth lens at a maximum radius and a center thickness CT6 of the sixth lens on the optical axis may satisfy: |SAG61|/CT6<1.

In an implementation, a combined refractive power of the third lens, the fourth lens and the fifth lens may be a positive refractive power.

In an implementation, each of the third lens and the fifth lens has a positive refractive power.

In an implementation, the fourth lens may have a negative refractive power.

In an implementation, half of a maximal field-of-view HFOV of the optical imaging system may satisfy: Tan (HFOV/2)≥0.9.

In an implementation, an effective focal length f3 of the third lens and an effective focal length f5 of the fifth lens may satisfy: 0<f3/f5<0.8

In an implementation, a total effective focal length f of the optical imaging system and a combined focal length f345 of the third lens, the fourth lens and the fifth lens may satisfy: 0.5<f/f345<0.9.

In an implementation, the total effective focal length f of the optical imaging system and an effective focal length f2 of the second lens may satisfy: f/f2≤0.2.

In an implementation, the total effective focal length f of the optical imaging system and an effective focal length f4 of the fourth lens may satisfy: −1.5<f/f4<−0.5.

In an implementation, an effective focal length f1 of the first lens and an effective focal length f6 of the sixth lens may satisfy: |f1/f6|<0.5.

In an implementation, an edge thickness ET6 of the sixth lens at the maximum radius and the center thickness CT6 of the sixth lens on the optical axis may satisfy: 1<ET6/CT6<2.

In an implementation, the sagittal height SAG61 of the object-side surface of the sixth lens at the maximum radius and the center thickness CT6 of the sixth lens on the optical axis may satisfy: |SAG61|/CT6<1.

In an implementation, the center thickness CT6 of the sixth lens on the optical axis and a center thickness CT1 of the first lens on the optical axis may satisfy: 0.5<CT6/CT1<1.0.

In an implementation, an air spacing T56 on the optical axis between the fifth lens and the sixth lens and a sum ΣAT of spacing distances on the optical axis between any two adjacent lenses from the first lens to the sixth lens may satisfy: 0.1<T56/ΣAT<0.5.

In an implementation, the total effective focal length f of the optical imaging system and a radius of curvature R3 of an object-side surface of the second lens may satisfy: f/|R3|<0.3.

In an implementation, a radius of curvature R7 of an object-side surface of the fourth lens and a radius of curvature R8 of an image-side surface of the fourth lens may satisfy: −5.0<R7/R8<0.

In an implementation, the total effective focal length f of the optical imaging system and an entrance pupil diameter EPD of the optical imaging system may satisfy: f/EPD≤2.2.

In the present disclosure, multiple lenses (e.g., six lenses) are used. By reasonably distributing the refractive powers and the surface types of the lenses, the center thicknesses of the lenses, the axial spacing distances between the lenses, etc., the optical imaging system may possess at least one of the following advantages:

effectively enlarging the field-of-view of the imaging system;

shortening the total length of the imaging system;

correcting various aberrations; and improving the resolution and the imaging quality of the lens assembly.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 9 is a schematic structural diagram illustrating an optical imaging system according to Embodiment 5 of the present disclosure;

FIGS. 10A-10D respectively illustrate a longitudinal aberration curve, an astigmatic curve, a lateral color curve, and a relative illumination curve of the optical imaging system according to Embodiment 5;

FIG. 13 is a schematic structural diagram illustrating an optical imaging system according to Embodiment 7 of the present disclosure;

FIGS. 14A-14D respectively illustrate a longitudinal aberration curve, an astigmatic curve, a lateral color curve, and a relative illumination curve of the optical imaging system according to Embodiment 7;

DETAILED DESCRIPTION

Figure 1:
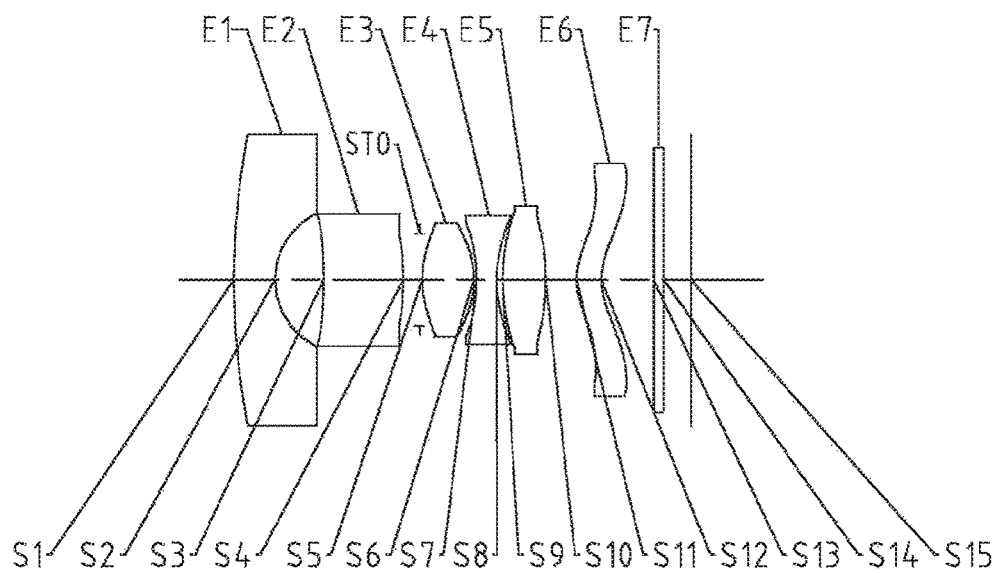
FIG. 1 is a schematic structural diagram illustrating an optical imaging system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging system according to exemplary implementations of the present disclosure includes, for example, six lenses (i.e., a first lens, a second lens, a third lens, a fourth lens, a fifth lens, and a sixth lens) having refractive powers. The six lenses are arranged in sequence along an optical axis from an object side to an image side. The optical imaging system according to the exemplary implementations of the present disclosure may further include an electronic photosensitive element disposed on an image plane.

The first lens may have a negative refractive power. The second lens may have a positive refractive power or a negative refractive power. The third lens may have a positive refractive power. The fourth lens may have a negative refractive power. The fifth lens may have a positive refractive power. The sixth lens may have a positive refractive power or a negative refractive power.

Half of a maximal field-of-view HFOV of the optical imaging system satisfies: $\text{Tan}(\text{HFOV}/2) \geq 0.9$, and more specifically, HFOV may further satisfy: $0.99 \leq \text{Tan}(\text{HFOV}/2) \leq 1.00$. By reasonably distributing the refractive powers and defining the field-of-view, the system obtains a large field-of-view under the premise of ensuring a good image quality.

An effective focal length $f3$ of the third lens and an effective focal length $f5$ of the fifth lens satisfy: $0 < f3/f5 < 0.8$, and more specifically, $f3$ and $f5$ may further satisfy: $0.36 \leq f3/f5 \leq 0.63$. By defining the refractive powers of the third lens and the fifth lens in a reasonable range, the system can have a good capability to balance astigmatism.

A total effective focal length $f$ of the optical imaging system and a combined focal length $f345$ of the third lens, the fourth lens and the fifth lens may satisfy: $0.5 < f/f345 < 0.9$, and more specifically, $f$ and $f345$ may further satisfy: $0.58 \leq f/f345 \leq 0.78$. By defining the combined refractive power of the third lens, the fourth lens, and the fifth lens in a reasonable range, the three lenses may assume reasonable refractive powers and meet requirements of the imaging field.

The total effective focal length $f$ of the optical imaging system and an effective focal length $f2$ of the second lens may satisfy: $f/f2 \leq 0.2$, and more specifically, $f$ and $f2$ may further satisfy: $0.075 \leq f/f2 \leq 0.15$. By constraining the numerical range of the effective focal length $f2$ of the second lens, the second lens has a reasonable capability to balance spherical aberrations and comatic aberrations, and thus the imaging quality of the system can be effectively improved.

The total effective focal length $f$ of the optical imaging system and an effective focal length $f4$ of the fourth lens may satisfy: $-1.5 < f/f4 < -0.5$, and more specifically, $f$ and $f4$ may further satisfy: $-1.36 \leq f/f45 \leq -0.83$. By defining the range of the negative refractive power of the fourth lens, the fourth lens generates positive spherical aberrations that may be used to balance the spherical aberrations of the system, thereby making the system have the good imaging quality.

An effective focal length $f1$ of the first lens and an effective focal length $f6$ of the sixth lens may satisfy: $|f1/f6| < 0.5$, and more specifically, $f1$ and $f6$ may further satisfy: $0.03 \leq |f1/f6| \leq 0.40$. By defining the ranges of the refractive powers of the first lens and the sixth lens, the first lens and the sixth lens can have reasonable distortion ranges.

An edge thickness ET6 of the sixth lens at a maximum radius and a center thickness CT6 of the sixth lens on the optical axis may satisfy: $1 < \text{ET6}/\text{CT6} < 2$, and more specifically, ET6 and CT6 may further satisfy: $1.16 \leq \text{ET6}/\text{CT6} \leq 1.67$. By defining the ranges of the edge thickness and the center thickness of the sixth lens, the sixth lens has a good processibility.

A sagittal height SAG61 of an object-side surface of the sixth lens at the maximum radius and the center thickness CT6 of the sixth lens on the optical axis may satisfy: $|\text{SAG61}|/\text{CT6} < 1$, and more specifically, SAG61 and CT6 may further satisfy: $0.02 \leq |\text{SAG61}|/\text{CT6} \leq 0.74$. By defining the maximum sagittal height of the sixth lens, the sixth lens can have the good processibility, thereby reducing processing errors.

The center thickness CT6 of the sixth lens on the optical axis and a center thickness CT1 of the first lens on the optical axis may satisfy: $0.5 < \text{CT6}/\text{CT1} < 1.0$, and more specifically, CT6 and CT1 may further satisfy: $0.55 \leq \text{CT6}/\text{CT1} \leq 0.85$. By defining the ranges of the center thicknesses of the sixth lens and the first lens, amounts of distortion of the sixth lens and the first lens in different directions are controlled, thus making the distortion of the large-field system distributed in a reasonable range.

An air spacing T56 on the optical axis between the fifth lens and the sixth lens and a sum EAT of spacing distances on the optical axis between any two adjacent lenses from the first lens to the sixth lens may satisfy: $0.1 < \text{T56}/\Sigma\text{AT} < 0.5$, and more specifically, T56 and $\Sigma\text{AT}$ may further satisfy: $0.13 \leq \text{T56}/\Sigma\text{AT} \leq 0.31$. By defining the spacing distance between the fifth lens and the sixth lens, an amount of astigmatism of the system can be adjusted to control the amount of astigmatism of the system within a reasonable range, so that the system has a good imaging quality and a good resolution capability.

The total effective focal length $f$ of the optical imaging system and a radius of curvature R3 of an object-side surface of the second lens may satisfy: $f/|\text{R3}| < 0.3$, and more specifically, $f$ and R3 may further satisfy: $0.11 \leq f/|\text{R3}| \leq 0.21$. By controlling the radius of curvature of the object-side surface of the second lens (when a diaphragm is disposed between the second lens and the third lens, the radius of curvature of the object-side surface of the second lens is the curvature of the lens near the diaphragm), the spherical aberrations of the system can be reasonably adjusted and controlled, thereby obtaining a good imaging quality in the axial and paraxial field-of-view of the optical imaging system.

A radius of curvature R7 of an object-side surface of the fourth lens and a radius of curvature R8 of an image-side surface of the fourth lens may satisfy: $-5.0 < \text{R7}/\text{R8} < 0$, and more specifically, R7 and R8 may further satisfy: $-3.545 \leq \text{R7}/\text{R8} \leq -0.85$. By reasonably controlling the ranges of the radii of curvature of the object-side surface and the image-side of the fourth lens (i.e., by reasonably controlling the bending directions and amount of bending of the object-side surface and image-side surface of the fourth lens), the fourth lens can have a good capability to balance longitudinal chromatic aberrations. Accordingly, the optical imaging system obtains a good imaging quality within a certain bandwidth of an imaging wave band.

The total effective focal length f of the optical imaging system and an entrance pupil diameter EPD of the optical imaging system may satisfy: f/EPD≤2.2, and more specifically, f and EPD may further satisfy: 1.8≤f/EPD≤2.2. By controlling the ratio of the total effective focal length f to the entrance pupil diameter EPD (i.e., the F-number of the system), the system can obtain the good imaging quality in a low-light condition. In addition, under the premise of sufficient freedom for designing, defining a reasonable F-number can reasonably enhance the design value of the transfer function of the system, thereby ensuring the good imaging quality of the optical system obtained in designing.

In the exemplary implementations, a diaphragm for limiting light beams may be disposed between, for example, the second lens and the third lens, to improve the imaging quality of the optical imaging system. Alternatively, the diaphragm may be an aperture diaphragm.

Alternatively, the optical imaging system may further include an optical filter for correcting color deviations and/or a protective glass for protecting the photosensitive element on the image plane.

In order to satisfy requirements of miniaturization and light weight, the lenses in the optical imaging system may be plastic lenses.

In addition, as known by those skilled in the art, the aspheric lens has a better radius-of-curvature characteristic, and has advantages of improving distortion aberrations and astigmatic aberrations. In the implementations of the present disclosure, the use of the aspheric lens can eliminate as much as possible the aberrations that occur during the imaging, thereby further improving the imaging quality of the optical imaging system. The use of the aspheric lens may not only improve the imaging quality and reduce the aberrations significantly, but also reduce the number of lenses in the lens assembly and the size of the lens assembly.

However, it should also be understood by those skilled in the art that the various results and advantages described in the present specification may be obtained by changing the number of the lenses constituting the optical imaging system without departing from the technical solution claimed by the present disclosure. For example, although the optical imaging system having six lenses is described as an example in the implementations, the optical imaging system is not limited to include six lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1-2D. FIG. 1 is a schematic structural diagram illustrating the optical imaging system according to Embodiment 1 of the present disclosure.

As shown in FIG. 1, the optical imaging system sequentially includes a first lens E1, a second lens E2, a third lens E3, a fourth lens E4, a fifth lens E5, a sixth lens E6, and an image plane S15 from an object side to an image side along an optical axis.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the imaging quality of the optical imaging system.

Table 1 shows the surface type, the radius of curvature, the thickness, the material and the conic coefficient of each lens of the optical imaging system in Embodiment 1, where the radius of curvature and the thickness are both shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | spherical | 8.5914 | 0.4500 | 1.59 | 58.3 | 0.0000 |
| S2 | spherical | 0.8209 | 0.5326 | | | 0.0000 |
| S3 | aspheric | −7.8417 | 0.8717 | 1.67 | 20.4 | −93.0722 |
| S4 | aspheric | −3.1689 | 0.1751 | | | −1.5309 |
| STO | spherical | infinite | 0.0300 | | | |
| S5 | aspheric | 1.1395 | 0.5628 | 1.55 | 56.1 | −1.6848 |
| S6 | aspheric | −1.0353 | 0.0300 | | | −1.5284 |
| S7 | aspheric | −2.3335 | 0.2200 | 1.65 | 23.5 | 4.3017 |
| S8 | aspheric | 1.1473 | 0.0713 | | | −2.6867 |
| S9 | aspheric | 1.7261 | 0.4709 | 1.55 | 56.1 | −4.7025 |
| S10 | aspheric | −5.7250 | 0.3356 | | | 43.4215 |
| S11 | aspheric | 0.6996 | 0.2709 | 1.54 | 55.9 | −3.4864 |
| S12 | aspheric | 0.7335 | 0.5697 | | | −1.1525 |
| S13 | spherical | infinite | 0.1100 | 1.52 | 64.2 | |
| S14 | spherical | infinite | 0.2994 | | | |
| S15 | spherical | infinite | | | | |

As may be obtained from Table 1, the radius of curvature R7 of the object-side surface S7 of the fourth lens E4 and the radius of curvature R8 of the image-side surface S8 of the fourth lens satisfy: R7/R8=−2.03. The center thickness CT6 of the sixth lens E6 on the optical axis and the center thickness CT1 of the first lens E1 on the optical axis satisfy: CT6/CT1=0.60. The air spacing T56 on the optical axis between the fifth lens E5 and the sixth lens E6 and the sum ΣAT of the spacing distances on the optical axis between any two adjacent lenses from the first lens E1 to the sixth lens E6 satisfy: T56/ΣAT=0.29.

In this embodiment, the optical imaging system having six lenses is used as an example. By reasonably distributing the focal lengths, the surface types and the center thicknesses of the lenses, and the spacing distances between the lenses, while the miniaturization of the imaging system is ensured, the field-of-view of the imaging system is enlarged, the resolution of the imaging system is enhanced and the imaging quality of the imaging system is improved. In this embodiment, the surface type x of each aspheric surface is defined by the following formula:

$$x = \frac{ch^2}{1 + \sqrt{1 - (k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S3-S12 in Embodiment 1.

Table 3 below shows the effective focal lengths f1-f6 of the lenses of the optical imaging system in Embodiment 1, the total effective focal length f of the optical imaging system, and the total track length TTL (i.e., the distance on the optical axis from the object-side surface S1 of the first lens E1 to the image plane S15) of the optical imaging system.

TABLE 3

| parameter | | | | | | |
|---|---|---|---|---|---|---|
| | f1(mm) | f2(mm) | f3(mm) | f4(mm) | f5(mm) | f6(mm) |
| numerical value | −1.56 | 7.43 | 1.09 | −1.17 | 2.48 | 7.44 |

| parameter | | |
|---|---|---|
| | f(nm) | TTL(mm) |
| numerical value | 1.13 | 5.00 |

As may be obtained from Table 3, the effective focal length f1 of the first lens E1 and the effective focal length f6 of the sixth lens E6 satisfy: |f1/f6|=0.21. The effective focal length f3 of the third lens E3 and the effective focal length f5 of the fifth lens E5 satisfy: f3/f5=0.44. The total effective focal length f of the optical imaging system and the effective focal length f2 of the second lens E2 satisfy: f/f2=0.15. The total effective focal length f of the optical imaging system and the effective focal length f4 of the fourth lens E4 satisfy: f/f4=−0.97. It may be obtained from Table 1 and Table 3 that the total effective focal length f of the optical imaging system and the radius of curvature R3 of the object-side surface of the second lens E2 satisfy: f/|R3|=0.14.

In this embodiment, the half of the maximal field-of-view HFOV of the optical imaging system satisfies: Tan(HFOV/2)=0.99. The total effective focal length f of the optical imaging system and the combined focal length f345 of the third lens E3, the fourth lens E4 and the fifth lens E5 satisfy: f/f345=0.64. The edge thickness ET6 of the sixth lens E6 at the maximum radius and the center thickness CT6 of the sixth lens E6 on the optical axis satisfy: ET6/CT6=1.18. The sagittal height SAG61 of the object-side surface S11 of the

TABLE 2

| surface number | A4 | A6 | A8 | A10 | A12 |
|---|---|---|---|---|---|
| S3 | −1.7553E−01 | 1.3183E−01 | −1.5464E+00 | 1.1707E+01 | −5.1788E+01 |
| S4 | −3.1499E−01 | 3.4848E−01 | 5.5349E+00 | −4.8811E+01 | 1.7812E+02 |
| S5 | −2.6728E−01 | 1.0314E+00 | −5.8917E+00 | 5.7324E+01 | −4.5220E+02 |
| S6 | −3.3988E−02 | −2.0410E−01 | −9.0532E+00 | 1.6861E+02 | −1.2779E+03 |
| S7 | −4.2177E−01 | 3.3253E+00 | −4.5561E+01 | 4.5464E+02 | −2.7433E+03 |
| S8 | −8.9820E−01 | 8.2369E+00 | −5.9849E+01 | 3.1949E+02 | −1.1649E+03 |
| S9 | −8.9636E−01 | 7.3677E+00 | −4.4222E+01 | 1.9499E+02 | −5.9649E+02 |
| S10 | −9.1872E−01 | 3.4563E+00 | −6.6826E+00 | −5.9963E+00 | 9.2279E+01 |
| S11 | −2.0497E−01 | −4.7345E−01 | 1.5047E+00 | −2.2506E+00 | 2.3143E+00 |
| S12 | −6.5593E−01 | 1.2997E−01 | 1.1861E+00 | −2.8995E+00 | 3.9187E+00 |

| surface number | A14 | A16 | A18 | A20 |
|---|---|---|---|---|
| S3 | 1.4358E+02 | −2.4500E+02 | 2.3585E+02 | −9.7920E+01 |
| S4 | −2.0732E+01 | −2.1502E+03 | 7.0216E+03 | −7.4311E+03 |
| S5 | 2.2966E+03 | −6.9708E+03 | 1.1466E+04 | −7.8298E+03 |
| S6 | 5.4214E+03 | −1.3488E+04 | 1.8360E+04 | −1.0520E+04 |
| S7 | 1.0220E+04 | −2.3267E+04 | 2.9723E+04 | −1.6279E+04 |
| S8 | 2.8198E+03 | −4.3439E+03 | 3.8527E+03 | −1.4944E+03 |
| S9 | 1.2511E+03 | −1.7183E+03 | 1.3826E+03 | −4.9125E+02 |
| S10 | −2.9552E+02 | 4.8786E+02 | −4.1815E+02 | 1.4573E+02 |
| S11 | −1.8114E+00 | 1.0024E+00 | −3.0411E−01 | 2.8014E−02 |
| S12 | −3.4197E+00 | 1.8808E+00 | −5.8525E−01 | 7.7585E−02 | sixth lens E6 at the maximum radius and the center thickness CT6 of the sixth lens E6 on the optical axis satisfy: |SAG61|/CT6=0.74. The total effective focal length f of the optical imaging system and the entrance pupil diameter EPD of the optical imaging system satisfy: f/EPD=2.1.

Figures 2A, 2B:
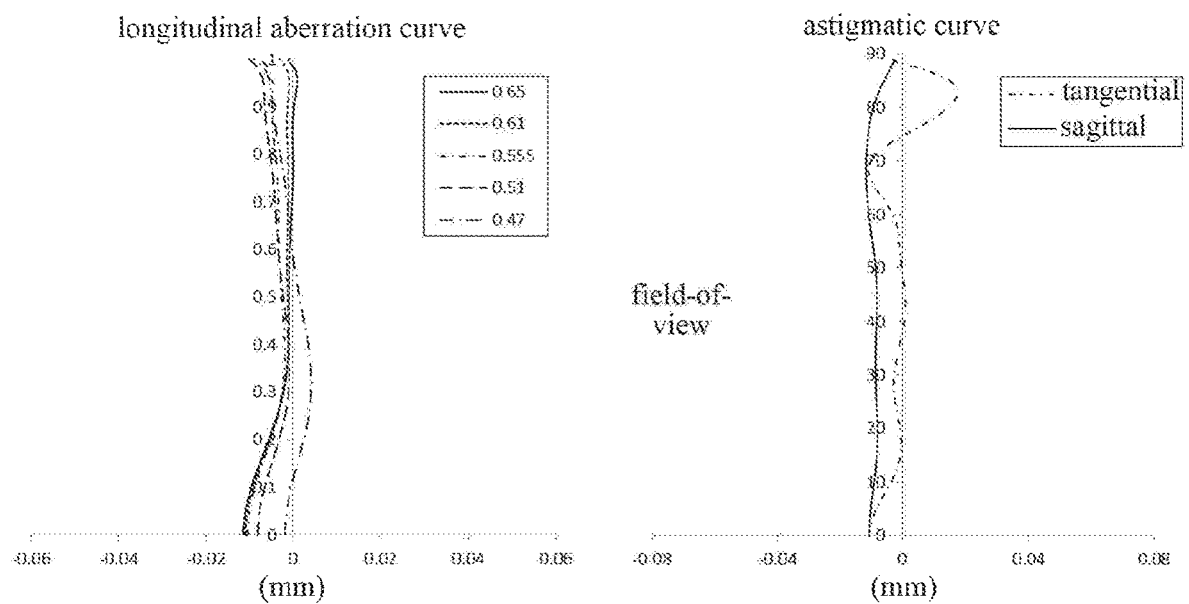
FIGS. 2A-2D respectively illustrate a longitudinal aberration curve, an astigmatic curve, a lateral color curve, and a relative illumination curve of the optical imaging system according to Embodiment 1.
Figure 2C:
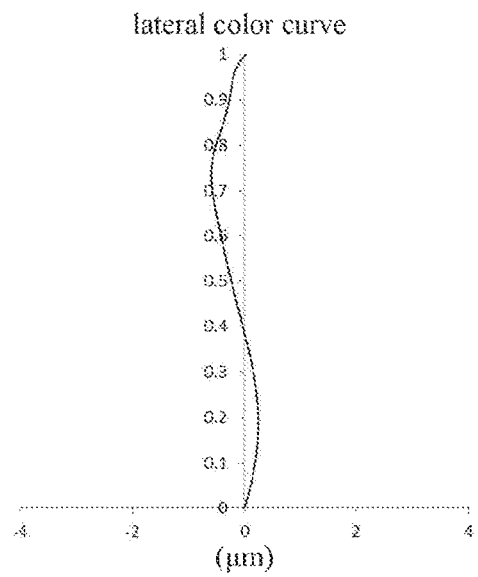
Figure 2D:
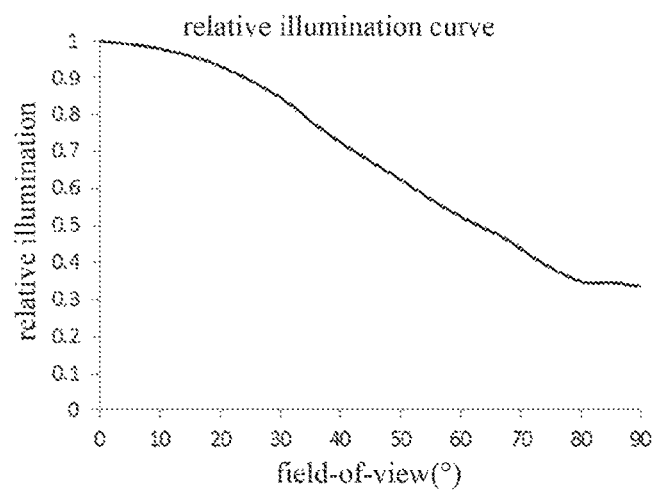

FIG. 2A illustrates the longitudinal aberration curve of the optical imaging system according to Embodiment 1, representing deviations of the focal points of the light of different wavelengths converged after passing through the optical system. FIG. 2B illustrates the astigmatic curve of the optical imaging system according to Embodiment 1, representing a curvature of the tangential image plane and a curvature of the sagittal image plane. FIG. 2C illustrates the lateral color curve of the optical imaging system according to Embodiment 1, representing deviations of different image heights on the image plane after light passes through the optical imaging system. FIG. 2D illustrates the relative illumination curve of the optical imaging system according to Embodiment 1, representing relative illuminations corresponding to different image heights on the image plane. It can be seen from FIGS. 2A-2D that the optical imaging system according to Embodiment 1 can achieve a good imaging quality.

Embodiment 2

Figure 3:
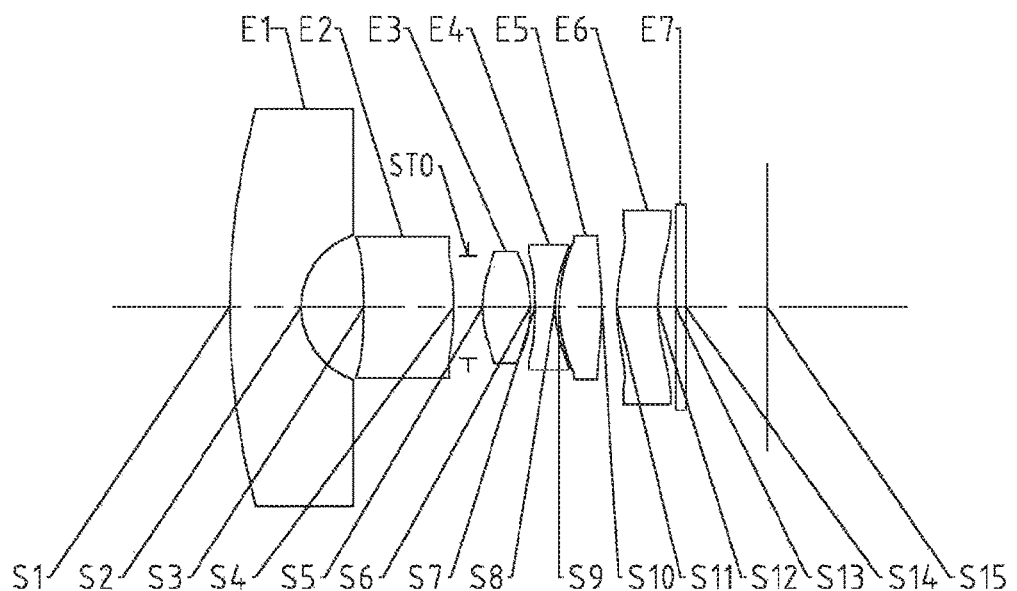
FIG. 3 is a schematic structural diagram illustrating an optical imaging system according to Embodiment 2 of the present disclosure.

An optical imaging system according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging system according to Embodiment 2 of the present disclosure.

As shown in FIG. 3, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S1 of the sixth lens E6 is a convex surface, and an image-side surface S12 of the sixth lens E6 is a concave surface. The object-side surface S1 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 4 shows the surface type, the radius of curvature, the thickness, the material and the conic coefficient of each lens of the optical imaging system in Embodiment 2, where the radius of curvature and the thickness are both shown in millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f6 of the lenses of the optical imaging system in Embodiment 2, the total effective focal length f of the optical imaging system, and the total track length TTL of the optical imaging system.

TABLE 4

| surface number | surface type | radius of curvature | thickness | material refractive index | abbe number | conic coefficient |
|---|---|---|---|---|---|---|
| OBJ | spherical | Infinite | infinite | | | |
| S1 | spherical | 8.5914 | 0.7971 | 1.59 | 58.3 | 0.0000 |
| S2 | spherical | 0.8581 | 0.7026 | | | 0.0000 |
| S3 | aspheric | −7.7660 | 1.0000 | 1.67 | 20.4 | 80.5955 |
| S4 | aspheric | −4.1619 | 0.1568 | | | −76.1056 |
| STO | spherical | infinite | 0.1631 | | | |
| S5 | aspheric | 1.2223 | 0.5373 | 1.55 | 56.1 | −0.7406 |
| S6 | aspheric | −1.3760 | 0.0540 | | | −0.0324 |
| S7 | aspheric | −3.5286 | 0.2200 | 1.65 | 23.5 | 3.0038 |
| S8 | aspheric | 1.2403 | 0.0476 | | | −1.8769 |
| S9 | aspheric | 1.6068 | 0.4790 | 1.55 | 56.1 | −0.4481 |
| S10 | aspheric | −4.5894 | 0.1609 | | | 23.5167 |
| S11 | aspheric | 1.6081 | 0.4550 | 1.54 | 55.9 | 1.6705 |
| S12 | aspheric | 1.5846 | 0.2035 | | | 0.2458 |
| S13 | spherical | infinite | 0.1100 | 1.52 | 64.2 | |
| S14 | spherical | infinite | 0.9130 | | | |
| S15 | spherical | infinite | | | | |

TABLE 5

| surface number | A4 | A6 | A8 | A10 | A12 |
|---|---|---|---|---|---|
| S3 | −1.2162E−01 | 1.8849E−01 | −1.5211E+00 | 7.5199E+00 | −2.2215E+01 |
| S4 | −3.4969E−01 | 5.4336E−01 | −3.2627E+00 | 6.2363E+01 | −6.0900E+02 |

TABLE 5-continued

| | | | | |
|---|---|---|---|---|
| S5 | −2.0378E−01 | 3.2852E−02 | 1.0041E+00 | −6.4533E+00 | 2.0050E+01 |
| S6 | 1.1024E+00 | −1.5869E+01 | 1.1787E+02 | −5.8169E+02 | 1.9839E+03 |
| S7 | 1.2959E+00 | −2.1182E+01 | 1.6181E+02 | −8.2867E+02 | 2.9733E+03 |
| S8 | 4.8189E−01 | −9.8620E+00 | 7.7021E+01 | −3.6649E+02 | 1.1380E+03 |
| S9 | −1.9894E−03 | −2.7700E+00 | 2.5870E+01 | −1.2059E+02 | 3.3379E+02 |
| S10 | −1.9917E−01 | 6.8777E−01 | 6.5421E−01 | −8.1660E+00 | 2.9627E+01 |
| S11 | −4.6199E−01 | 3.7327E−01 | −2.0280E−01 | −1.5536E+00 | 5.0672E+00 |
| S12 | −1.9763E−01 | −2.8461E−01 | 1.3506E+00 | −3.4902E+00 | 5.8410E+00 |

| surface number | A14 | A16 | A18 | A20 |
|---|---|---|---|---|
| S3 | 4.0669E+01 | −4.3886E+01 | 2.5016E+01 | −5.3709E+00 |
| S4 | 3.2671E+03 | −9.9395E+03 | 1.6140E+04 | −1.0884E+04 |
| S5 | −2.0390E+01 | −3.8759E+01 | 1.1667E+02 | −7.7554E+01 |
| S6 | −4.5826E+03 | 6.8212E+03 | −5.9036E+03 | 2.2676E+03 |
| S7 | −7.2782E+03 | 1.1485E+04 | −1.0493E+04 | 4.2140E+03 |
| S8 | −2.3034E+03 | 2.9207E+03 | −2.1028E+03 | 6.5468E+02 |
| S9 | −5.6423E+02 | 5.6340E+02 | −2.9658E+02 | 5.8853E+01 |
| S10 | −6.7880E+01 | 9.9202E+01 | −8.0247E+01 | 2.6532E+01 |
| S11 | −9.0639E+00 | 9.4133E+00 | −5.0115E+00 | 8.6763E−01 |
| S12 | −6.5492E+00 | 4.7350E+00 | −1.9827E+00 | 3.6236E−01 |

TABLE 6

| | parameter | | | | | |
|---|---|---|---|---|---|---|
| | f1(mm) | f2(mm) | f3(mm) | f4(mm) | f5(mm) | f6(mm) |
| numerical value | −1.67 | 12.13 | 1.28 | −1.40 | 2.24 | 35.06 |

| | parameter | |
|---|---|---|
| | f(mm) | TTL(mm) |
| numerical value | 1.20 | 6.00 |

Figure 4A:
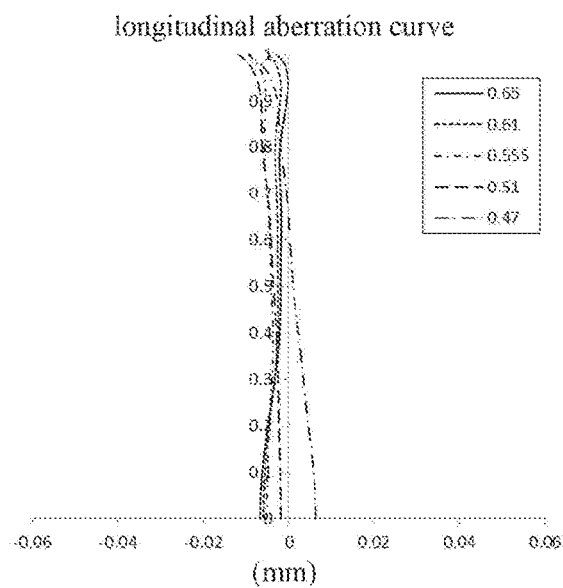
FIGS. 4A-4D respectively illustrate a longitudinal aberration curve, an astigmatic curve, a lateral color curve, and a relative illumination curve of the optical imaging system according to Embodiment 2.
Figure 4B:
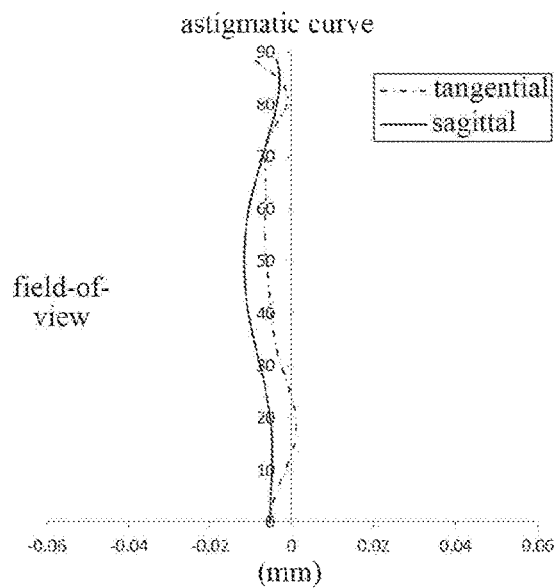
Figure 4C:
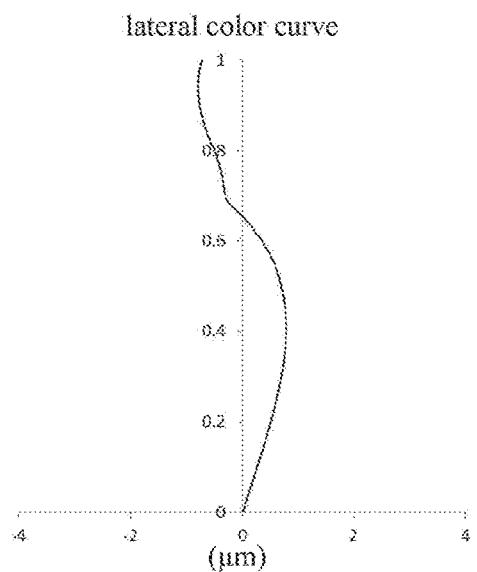
Figure 4D:
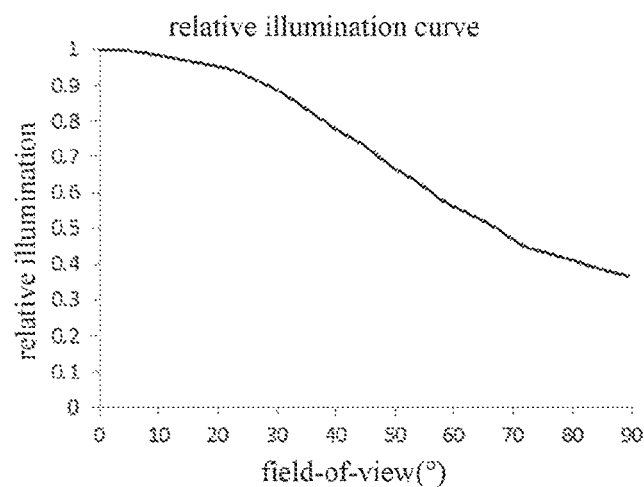

FIG. 4A illustrates the longitudinal aberration curve of the optical imaging system according to Embodiment 2, representing deviations of the focal points of the light of different wavelengths converged after passing through the optical system. FIG. 4B illustrates the astigmatic curve of the optical imaging system according to Embodiment 2, representing a curvature of the tangential image plane and a curvature of the sagittal image plane. FIG. 4C illustrates the lateral color curve of the optical imaging system according to Embodiment 2, representing deviations of different image heights on the image plane after light passes through the optical imaging system. FIG. 4D illustrates the relative illumination curve of the optical imaging system according to Embodiment 2, representing relative illuminations corresponding to different image heights on the image plane. It can be seen from FIGS. 4A-4D that the optical imaging system according to Embodiment 2 can achieve a good imaging quality.

Embodiment 3

Figure 5:
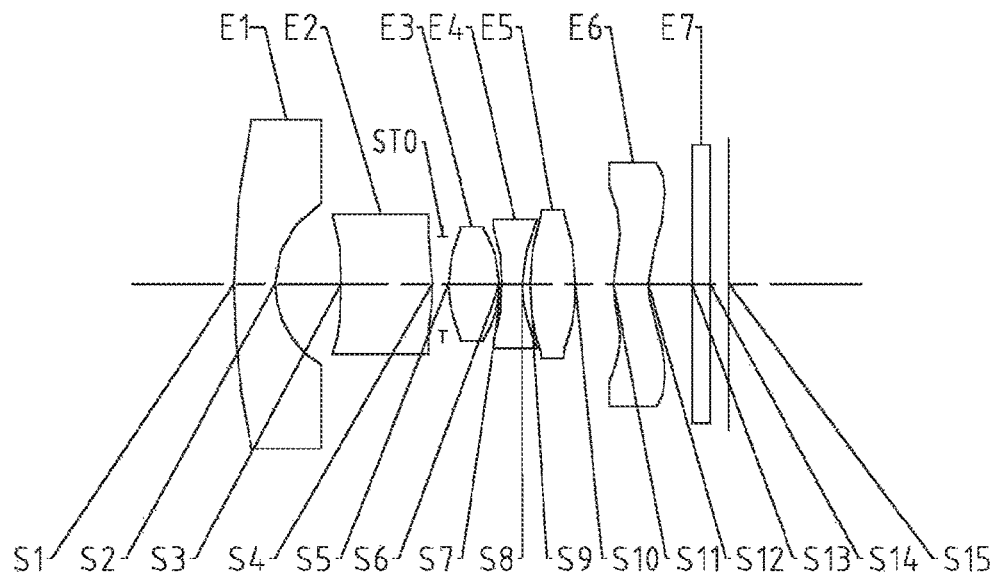
FIG. 5 is a schematic structural diagram illustrating an optical imaging system according to Embodiment 3 of the present disclosure.

An optical imaging system according to Embodiment 3 of the present disclosure is described below with reference to FIGS. 5-6D. FIG. 5 is a schematic structural diagram illustrating the optical imaging system according to Embodiment 3 of the present disclosure.

As shown in FIG. 5, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 7 shows the surface type, the radius of curvature, the thickness, the material and the conic coefficient of each lens of the optical imaging system in Embodiment 3, where the radius of curvature and the thickness are both shown in millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1-f6 of the lenses of the optical imaging system in Embodiment 3, the total effective focal length f of the optical imaging system, and the total track length TTL of the optical imaging system.

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | spherical | 8.5914 | 0.4500 | 1.59 | 58.3 | 0.0000 |

TABLE 7-continued

| surface number | surface type | radius of curvature | thickness | material refractive index | abbe number | conic coefficient |
|---|---|---|---|---|---|---|
| S2 | spherical | 1.0400 | 0.7208 | | | 0.0000 |
| S3 | aspheric | −7.1223 | 1.0000 | 1.67 | 10.4 | −20.3270 |
| S4 | aspheric | −4.5599 | 0.1146 | | | 5.8699 |
| STO | spherical | infinite | 0.0626 | | | |
| S5 | aspheric | 1.1436 | 0.5637 | 1.55 | 56.1 | −2.3091 |
| S6 | aspheric | −1.0213 | 0.0300 | | | −1.7161 |
| S7 | aspheric | −2.5978 | 0.2200 | 1.65 | 23.5 | 3.8870 |
| S8 | aspheric | 1.1487 | 0.0848 | | | −2.9641 |
| S9 | aspheric | 1.7720 | 0.4963 | 1.55 | 56.1 | −6.9726 |
| S10 | aspheric | −4.9549 | 0.4190 | | | 30.7648 |
| S11 | aspheric | 1.0534 | 0.3811 | 1.54 | 55.9 | −8.7518 |
| S12 | aspheric | 0.8603 | 0.4767 | | | −1.1426 |
| S13 | spherical | infinite | 0.1984 | 1.52 | 64.2 | |
| S14 | spherical | infinite | 0.2065 | | | |
| S15 | spherical | infinite | | | | |

TABLE 8

| surface number | A4 | A6 | A8 | A10 | A12 |
|---|---|---|---|---|---|
| S3 | −1.6875E−01 | 1.9864E−01 | −1.8547E+00 | 9.8054E+00 | −3.0923E+01 |
| S4 | −3.4875E−01 | −7.2990E−01 | 3.5333E+01 | −4.4785E+02 | 3.3986E+03 |
| S5 | −3.1828E−01 | 9.8056E−01 | −2.4878E+00 | −2.3513E+00 | 7.4021E+01 |
| S6 | 1.0116E+00 | −1.9995E+01 | 1.9396E+02 | −1.2041E+03 | 4.9992E+03 |
| S7 | 7.6091E−01 | −1.8941E+01 | 1.8101E+02 | −1.0648E+03 | 4.1911E+03 |
| S8 | −3.9193E−01 | 2.9521E−01 | 6.6474E+00 | −3.4360E+01 | 7.9671E+01 |
| S9 | −6.1351E−01 | 3.9952E+00 | −2.4327E+01 | 1.2317E+02 | −4.4233E+02 |
| S10 | −7.0551E−01 | 1.9410E+00 | −2.5130E+00 | −8.3553E+00 | 6.1465E+01 |
| S11 | −2.0519E−01 | −1.6878E+00 | 6.6116E+00 | −1.4638E+01 | 2.2279E+01 |
| S12 | −7.6140E−01 | 3.5263E−01 | 1.1257E+00 | −3.2315E+00 | 4.3315E+00 |

| surface number | A14 | A16 | A18 | A20 |
|---|---|---|---|---|
| S3 | 6.0330E+01 | −7.0627E+01 | 4.5378E+01 | −1.2246E+01 |
| S4 | −1.6136E+04 | 4.6810E+04 | −7.5788E+04 | 5.2465E+04 |
| S5 | −3.6995E+02 | 9.1548E+02 | −1.1362E+03 | 5.6350E+02 |
| S6 | −1.3741E+04 | 2.3903E+04 | −2.3746E+04 | 1.0248E+04 |
| S7 | −1.1009E+04 | 1.8414E+04 | −1.7649E+04 | 7.3508E+03 |
| S8 | −7.2315E+01 | −6.1182E+01 | 1.8764E+02 | −1.1668E+02 |
| S9 | 1.0607E+03 | −1.5878E+03 | 1.3320E+03 | −4.7782E+02 |
| S10 | −1.6908E+02 | 2.4926E+02 | −1.8898E+02 | 5.7177E+01 |
| S11 | −2.3200E+01 | 1.5565E+01 | −5.9550E+00 | 9.6594E−01 |
| S12 | −3.4662E+00 | 1.6710E+00 | −4.4627E−01 | 5.0512E−02 |

TABLE 9

| | parameter | | | | | |
|---|---|---|---|---|---|---|
| | f1(mm) | f2(mm) | f3(mm) | f4(mm) | f5(mm) | f6(mm) |
| numerical value | −2.04 | 16.47 | 1.09 | −1.21 | 2.45 | −28.16 |

| | parameter | |
|---|---|---|
| | f(mm) | TTL(mm) |
| numerical value | 1.26 | 5.42 |

Figures 6A, 6B:
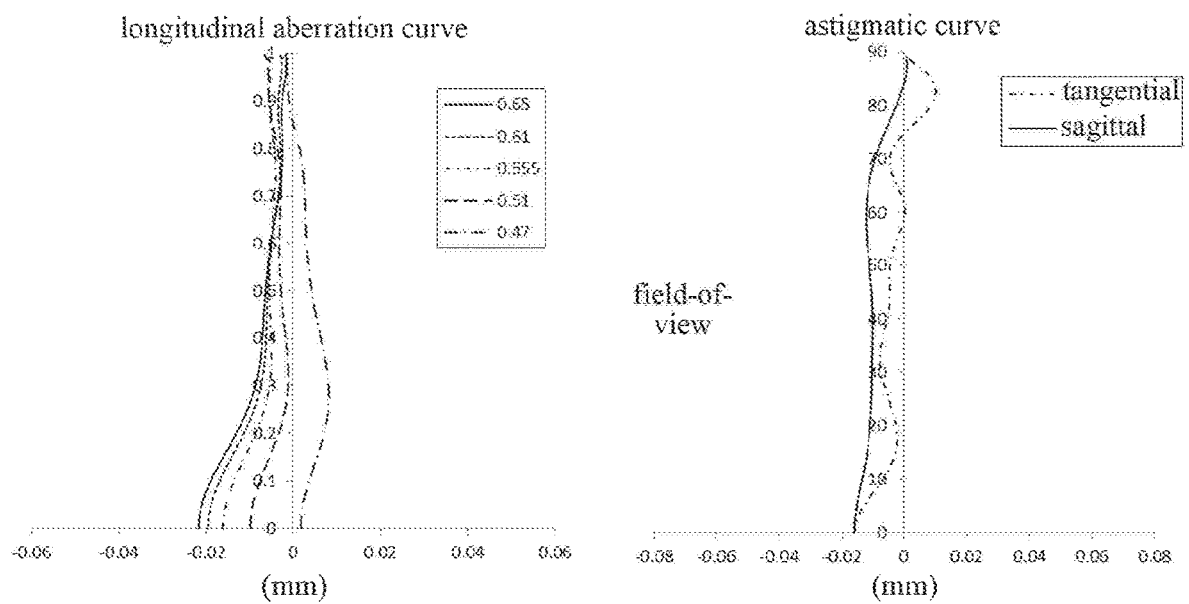
FIGS. 6A-6D respectively illustrate a longitudinal aberration curve, an astigmatic curve, a lateral color curve, and a relative illumination curve of the optical imaging system according to Embodiment 3.
Figure 6C:
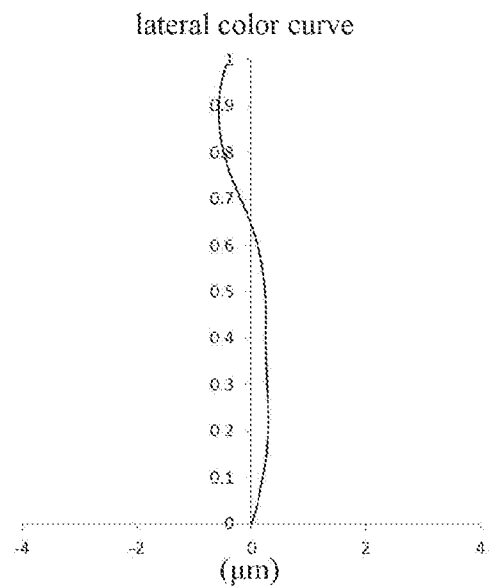
Figure 6D:
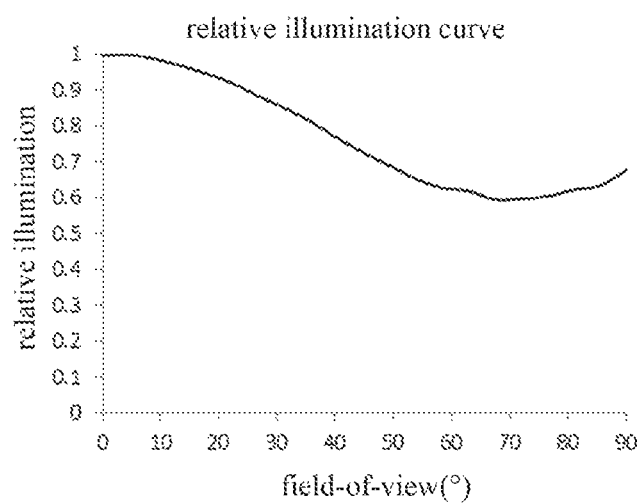

FIG. 6A illustrates the longitudinal aberration curve of the optical imaging system according to Embodiment 3, representing deviations of the focal points of the light of different wavelengths converged after passing through the optical system. FIG. 6B illustrates the astigmatic curve of the optical imaging system according to Embodiment 3, representing a curvature of the tangential image plane and a curvature of the sagittal image plane. FIG. 6C illustrates the lateral color curve of the optical imaging system according to Embodiment 3, representing deviations of different image heights on the image plane after light passes through the optical imaging system. FIG. 6D illustrates the relative illumination curve of the optical imaging system according to Embodiment 3, representing relative illuminations corresponding to different image heights on the image plane. It can be seen from FIGS. 6A-6D that the optical imaging system according to Embodiment 3 can achieve a good imaging quality.

Embodiment 4

Figure 7:
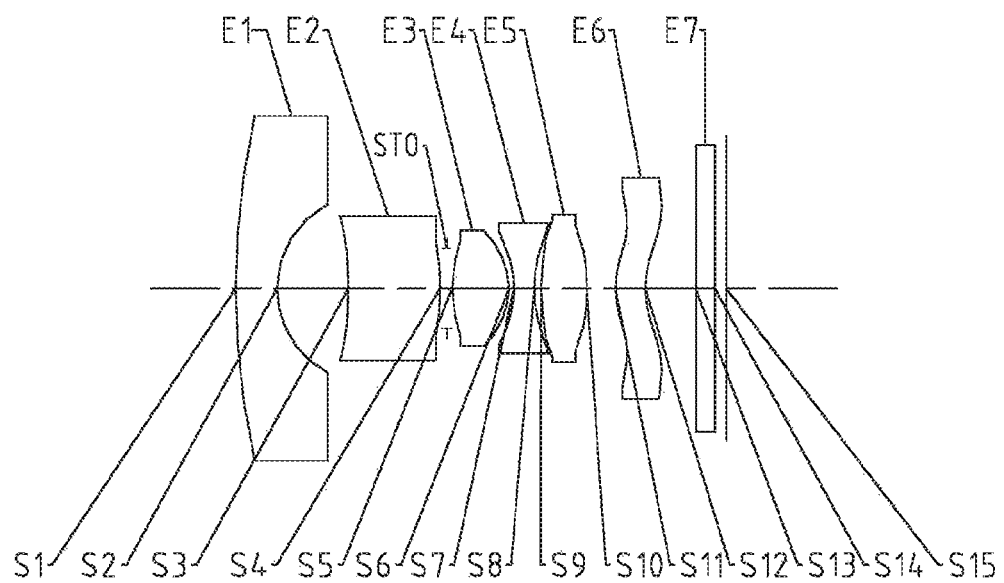
FIG. 7 is a schematic structural diagram illustrating an optical imaging system according to Embodiment 4 of the present disclosure.

An optical imaging system according to Embodiment 4 of the present disclosure is described below with reference to FIGS. 7-8D. FIG. 7 is a schematic structural diagram illustrating the optical imaging system according to Embodiment 4 of the present disclosure.

As shown in FIG. 7, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 10 shows the surface type, the radius of curvature, the thickness, the material and the conic coefficient of each lens of the optical imaging system in Embodiment 4, where the radius of curvature and the thickness are both millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f6 of the lenses of the optical imaging system in Embodiment 4, the total effective focal length f of the optical imaging system, and the total track length TTL of the optical imaging system.

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | spherical | 8.5914 | 0.4500 | 1.59 | 58.3 | 0.0000 |
| S2 | spherical | 1.0400 | 0.7805 | | | 0.0000 |
| S3 | aspheric | −4.9717 | 1.0000 | 1.67 | 20.4 | −27.0475 |
| S4 | aspheric | −3.5340 | 0.0748 | | | −0.1311 |
| STO | spherical | infinite | 0.0567 | | | |
| S5 | aspheric | 1.2261 | 0.6215 | 1.55 | 56.1 | −2.9227 |
| S6 | aspheric | −0.6181 | 0.0532 | | | −1.9448 |
| S7 | aspheric | −0.9625 | 0.2200 | 1.65 | 23.5 | −7.3665 |
| S8 | aspheric | 1.1319 | 0.0733 | | | −3.7225 |
| S9 | aspheric | 1.7601 | 0.5023 | 1.55 | 56.1 | −6.5089 |
| S10 | aspheric | −4.2765 | 0.3101 | | | 25.1046 |
| S11 | aspheric | 0.8652 | 0.3269 | 1.54 | 55.9 | −2.9139 |
| S12 | aspheric | 1.0954 | 0.5504 | | | −0.3646 |
| S13 | spherical | infinite | 0.2096 | 1.52 | 64.2 | |
| S14 | spherical | infinite | 0.1222 | | | |
| S15 | spherical | infinite | | | | |

TABLE 11

| surface number | A4 | A6 | A8 | A10 | A12 |
|---|---|---|---|---|---|
| S3 | −9.8723E−02 | −1.6030E−01 | 6.7445E−01 | −7.5105E−02 | −9.6099E+00 |
| S4 | −2.2667E−01 | −1.2518E+00 | 3.9107E+01 | −3.8552E+02 | 1.9682E+03 |
| S5 | −2.7251E−01 | 1.7208E+00 | −2.5223E+01 | 3.2145E+02 | −2.7804E+03 |
| S6 | 1.9199E+00 | −2.1534E+01 | 1.5776E+02 | −9.1766E+02 | 4.1340E+03 |
| S7 | 9.7723E−01 | −1.4612E+01 | 8.1274E+01 | −2.4446E+02 | 3.4300E+02 |
| S8 | −8.7971E−01 | 8.8871E+00 | −6.5963E+01 | 3.3416E+02 | −1.1297E+03 |
| S9 | −1.1781E+00 | 1.0465E+01 | −6.0959E+01 | 2.5295E+02 | −7.6055E+02 |
| S10 | −9.9933E−01 | 4.4231E+00 | −2.5009E+01 | 1.2971E+02 | −4.4886E+02 |
| S11 | −4.0599E−01 | 1.8400E+00 | −1.7043E+01 | 6.4576E+01 | −1.3202E+02 |
| S12 | 3.1380E−01 | −3.7091E+00 | 8.8798E+00 | −1.2177E+01 | 1.0479E+01 |

| surface number | A14 | A16 | A18 | A20 |
|---|---|---|---|---|
| S3 | 4.1525E+01 | −8.2963E+01 | 8.2408E+01 | −3.2719E+01 |
| S4 | −4.6512E+03 | 1.1072E+03 | 1.3913E+04 | −1.6819E+04 |
| S5 | 1.5109E+04 | −4.9831E+04 | 9.0347E+04 | −6.8610E+04 |
| S6 | −1.3392E+04 | 2.8173E+04 | −3.3804E+04 | 1.7423E+04 |
| S7 | 3.3224E+02 | −3.0699E+03 | 7.1577E+03 | −6.1190E+03 |
| S8 | 2.5532E+03 | −3.7557E+03 | 3.2752E+03 | −1.2864E+03 |
| S9 | 1.6531E+03 | −2.4298E+03 | 2.1181E+03 | −8.1690E+02 |
| S10 | 9.8722E+02 | −1.3347E+03 | 1.0278E+03 | −3.4830E+02 |
| S11 | 1.5895E+02 | −1.1268E+02 | 4.3588E+01 | −7.1141E+00 |
| S12 | −5.8431E+00 | 2.1001E+00 | −4.4991E−01 | 4.3036E−02 |

TABLE 12

| parameter | f1(mm) | f2(mm) | f3(mm) | f4(mm) | f5(mm) | f6(mm) |
|---|---|---|---|---|---|---|
| numerical value | −2.04 | 14.36 | 0.85 | −0.78 | 2.35 | 5.13 |

| parameter | f(mm) | TTL(mm) |
|---|---|---|
| numerical value | 1.06 | 5.35 |

Figure 8A:
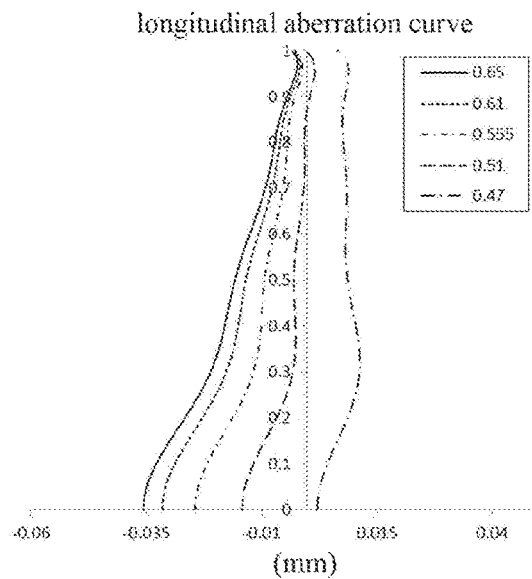
FIGS. 8A-8D respectively illustrate a longitudinal aberration curve, an astigmatic curve, a lateral color curve, and a relative illumination curve of the optical imaging system according to Embodiment 4.
Figure 8B:
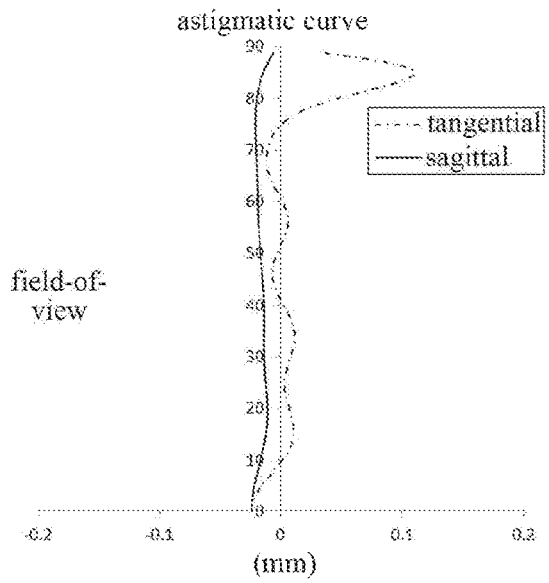
Figure 8C:
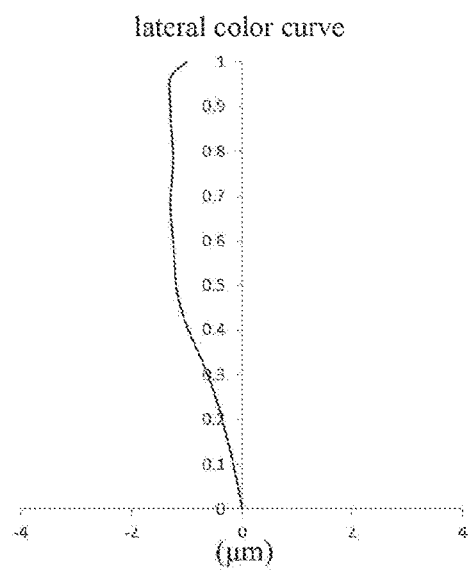
Figure 8D:
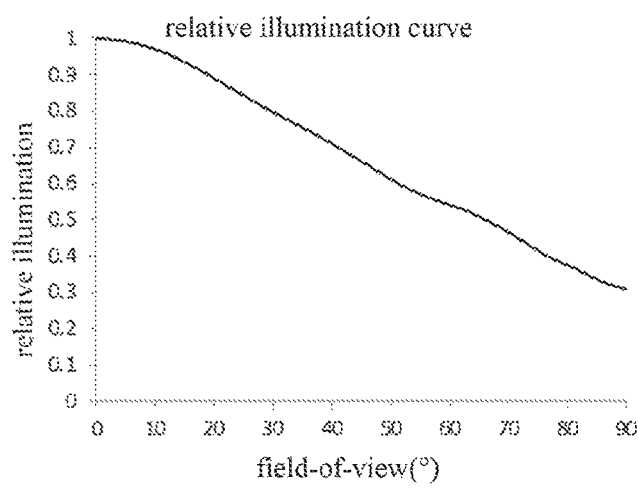

FIG. 8A illustrates the longitudinal aberration curve of the optical imaging system according to Embodiment 4, representing deviations of the focal points of the light of different wavelengths converged after passing through the optical system. FIG. 8B illustrates the astigmatic curve of the optical imaging system according to Embodiment 4, representing a curvature of the tangential image plane and a curvature of the sagittal image plane. FIG. 8C illustrates the lateral color curve of the optical imaging system according to Embodiment 4, representing deviations of different image heights on the image plane after light passes through the optical imaging system. FIG. 8D illustrates the relative illumination curve of the optical imaging system according to Embodiment 4, representing relative illuminations corresponding to different image heights on the image plane. It can be seen from FIGS. 8A-8D that the optical imaging system according to Embodiment 4 can achieve a good imaging quality.

Embodiment 5

An optical imaging system according to Embodiment 5 of the present disclosure is described below with reference to FIGS. 9-10D. FIG. 9 is a schematic structural diagram illustrating the optical imaging system according to Embodiment 5 of the present disclosure.

As shown in FIG. 9, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 13 shows the surface type, the radius of curvature, the thickness, the material and the conic coefficient of each lens of the optical imaging system in Embodiment 5, where the radius of curvature and the thickness are both millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f6 of the lenses of the optical imaging system in Embodiment 5, the total effective focal length f of the optical imaging system, and the total track length TTL of the optical imaging system.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | spherical | 8.5914 | 0.4500 | 1.59 | 58.3 | 0.0000 |
| S2 | spherical | 1.0400 | 0.6834 | | | 0.0000 |
| S3 | aspheric | −7.623.3 | 1.0000 | 1.67 | 20.4 | 42.0081 |
| S4 | aspheric | −3.8946 | 0.1725 | | | −19.7164 |
| STO | spherical | infinite | 0.0497 | | | |
| S5 | aspheric | 1.2128 | 0.5494 | 1.55 | 56.1 | −2.0250 |
| S6 | aspheric | −1.1441 | 0.0300 | | | −0.7822 |
| S7 | aspheric | −3.8859 | 0.2255 | 1.65 | 23.5 | 9.6635 |
| S8 | aspheric | 1.0967 | 0.0956 | | | −3.9282 |
| S9 | aspheric | 2.4458 | 0.5745 | 1.55 | 56.1 | −17.0301 |
| S10 | aspheric | −1.7322 | 0.4579 | | | −0.6946 |
| S11 | aspheric | 1.1687 | 0.2722 | 1.54 | 55.9 | −11.6579 |
| S12 | aspheric | 0.7623 | 0.4147 | | | −3.0957 |
| S13 | spherical | infinite | 0.2100 | 1.52 | 64.2 | |
| S14 | spherical | infinite | 0.2578 | | | |
| S15 | spherical | infinite | | | | |

TABLE 14

| surface number | A4 | A6 | A8 | A10 | A12 |
|---|---|---|---|---|---|
| S3 | −1.1514E−01 | −8.2836E−02 | 5.6436E−01 | −2.7003E+00 | 8.9478E+00 |
| S4 | −2.8358E−01 | 3.8919E−01 | −9.8077E−02 | 4.9521E+00 | −5.1662E+01 |
| S5 | −1.3351E−01 | 4.6584E−01 | −1.0582E+00 | 9.5335E−01 | 1.3738E+00 |
| S6 | 3.4618E−01 | −3.1393E+00 | 1.5483E+01 | −4.5413E+01 | 7.6783E+01 |
| S7 | −4.2176E−01 | −7.8134E−01 | 6.2939E+00 | −6.1480E+01 | −4.6416E+01 |
| S8 | −5.1492E−01 | 2.4199E+00 | −9.0804E+00 | 2.9204E+01 | −6.7946E+01 |
| S9 | −1.2224E−03 | 4.2937E−01 | −1.8805E+00 | 4.4941E+00 | −6.6836E+00 |
| S10 | −1.7121E−01 | 4.5804E−01 | −5.3934E+00 | 3.6806E−01 | −1.6329E−01 |
| S11 | −2.9609E−01 | −1.0103E+00 | 3.7338E+00 | −6.3381E+00 | 6.3954E+00 |
| S12 | −5.6924E−01 | 6.8234E−01 | −5.8200E−01 | 3.6829E−01 | −2.1595E−01 |

| surface number | A14 | A16 | A18 | A20 |
|---|---|---|---|---|
| S3 | −1.8649E+01 | 2.3647E+01 | −1.6570E+01 | 4.9131E+00 |
| S4 | 2.1788E+02 | −4.4709E+02 | 4.1895E+02 | −1.2048E+02 |
| S5 | −6.8517E+00 | 1.2160E+01 | −9.9216E+00 | 3.0296E+00 |
| S6 | −6.8273E+01 | 2.3364E+01 | 4.6909E+00 | −3.8539E+00 |
| S7 | 1.8219E+02 | −2.8220E+02 | 2.0498E+02 | −5.7620E+01 |
| S8 | 1.0419E+02 | −9.7652E+01 | 4.9836E+01 | −1.0439E+01 |
| S9 | 5.8956E+00 | −2.7810E+00 | 5.2559E−01 | 9.9603E−03 |
| S10 | 4.8407E−02 | −9.3029E−03 | 1.0475E−03 | −5.2227E−05 |
| S11 | −4.0020E+00 | 1.4989E+00 | −3.0116E−01 | 2.3913E−02 |
| S12 | 1.1457E−01 | −4.3746E−02 | 9.2694E−03 | −7.8604E−04 |

TABLE 15

| parameter | f1(mm) | f2(mm) | f3(mm) | f4(mm) | f5(mm) | f6(mm) |
|---|---|---|---|---|---|---|
| numerical value | −2.04 | 10.80 | 1.18 | −1.31 | 1.95 | −5.33 |

| parameter | f(mm) | TTL(mm) |
|---|---|---|
| numerical value | 1.27 | 5.44 |

Figures 10C, 10D:
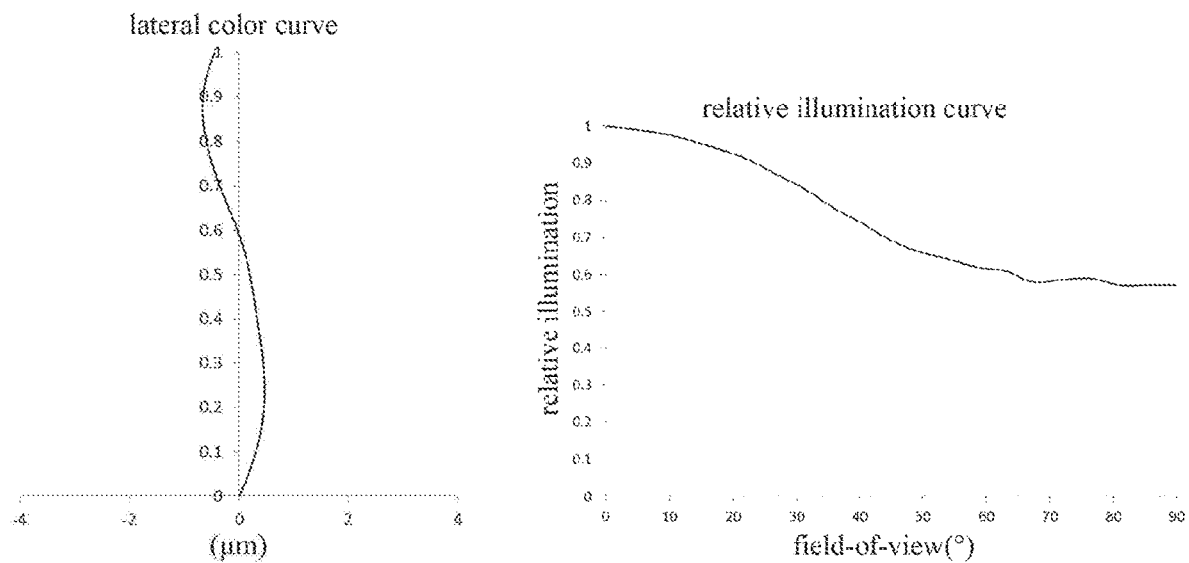

FIG. 10A illustrates the longitudinal aberration curve of the optical imaging system according to Embodiment 5, representing deviations of the focal points of the light of different wavelengths converged after passing through the optical system. FIG. 10B illustrates the astigmatic curve of the optical imaging system according to Embodiment 5, representing a curvature of the tangential image plane and a curvature of the sagittal image plane. FIG. 10C illustrates the lateral color curve of the optical imaging system according to Embodiment 5, representing deviations of different image heights on the image plane after light passes through the optical imaging system. FIG. 10D illustrates the relative illumination curve of the optical imaging system according to Embodiment 5, representing relative illuminations corresponding to different image heights on the image plane. It can be seen from FIGS. 10A-10D that the optical imaging system according to Embodiment 5 can achieve a good imaging quality.

Embodiment 6

Figure 11:
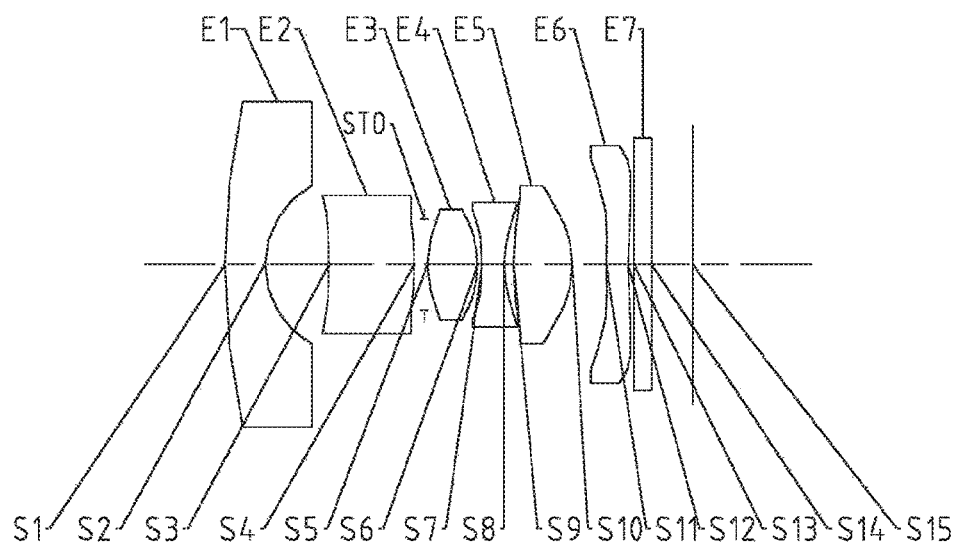
FIG. 11 is a schematic structural diagram illustrating an optical imaging system according to Embodiment 6 of the present disclosure.

An optical imaging system according to Embodiment 6 of the present disclosure is described below with reference to FIGS. 11-12D. FIG. 11 is a schematic structural diagram illustrating the optical imaging system according to Embodiment 6 of the present disclosure.

As shown in FIG. 11, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the imaging quality of the optical imaging system.

Table 16 shows the surface type, the radius of curvature, the thickness, the material and the conic coefficient of each lens of the optical imaging system in Embodiment 6, where the radius of curvature and the thickness are both shown in millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f6 of the lenses of the optical imaging system in Embodiment 6, the total effective focal length f of the optical imaging system, and the total track length TTL of the optical imaging system.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | spherical | 8.5914 | 0.4576 | 1.59 | 58.3 | 0.0000 |
| S2 | spherical | 1.0400 | 0.7267 | | | 0.0000 |
| S3 | aspheric | −9.7408 | 0.9742 | 1.67 | 20.4 | −61.4356 |
| S4 | aspheric | −4.3243 | 0.1125 | | | −2.9427 |
| STO | spherical | infinite | 0.0368 | | | |
| S5 | aspheric | 1.2094 | 0.5753 | 1.5 | 56.1 | −2.0541 |
| S6 | aspheric | −1.0147 | 0.0534 | | | −0.9133 |
| S7 | aspheric | −2.9163 | 0.2518 | 1.65 | 23.5 | 1.7027 |
| S8 | aspheric | 1.1732 | 0.1103 | | | −3.9060 |
| S9 | aspheric | 4.0040 | 0.6672 | 1.55 | 56.1 | 19.5050 |
| S10 | aspheric | −1.1852 | 0.3857 | | | −0.9665 |
| S11 | aspheric | 7.6165 | 0.2511 | 1.54 | 55.9 | 7.8950 |
| S12 | aspheric | 9.3819 | 0.0664 | | | 30.9209 |
| S13 | spherical | infinite | 0.1995 | 1.52 | 64.2 | |
| S14 | spherical | infinite | 0.4683 | | | |
| S15 | spherical | infinite | | | | |

TABLE 17

| surface number | A4 | A6 | A8 | A10 | A12 |
|---|---|---|---|---|---|
| S3 | −2.3715E−01 | 2.8998E+00 | −2.6937E+01 | 1.3984E+02 | −4.4808E+02 |
| S4 | −2.9932E−01 | 6.5824E−01 | 1.3484E+00 | −1.5908E+01 | 5.7242E+01 |
| S5 | −1.6956E−01 | 8.6321E−01 | −2.5301E+00 | 5.1704E+00 | −7.7453E+00 |
| S6 | 4.6964E−01 | −3.1061E+00 | 1.5383E+01 | −5.3560E+01 | 1.1602E+02 |
| S7 | −3.8695E−01 | −3.4158E−01 | 4.2379E−01 | 1.2263E+01 | −5.6461E+01 |
| S8 | −1.7506E−01 | −2.0675E+00 | 2.2967E+01 | −1.1321E+02 | 3.3141E+02 |
| S9 | 3.3849E−01 | −5.4360E+00 | 3.3642E+01 | −1.2139E+02 | 2.7687E+02 |
| S10 | 1.8769E−01 | −2.0154E+00 | 5.6205E+00 | −6.9038E+00 | 4.5077E+00 |
| S11 | 2.0394E−03 | −1.8195E+00 | 4.8878E+00 | −6.4893E+00 | 5.0780E+00 |
| S12 | 2.4382E−02 | −5.7384E−02 | 4.4179E−03 | −4.8904E−05 | −9.1623E−06 |

| surface number | A14 | A16 | A18 | A20 |
|---|---|---|---|---|
| S3 | 9.0459E+02 | −1.1174E+03 | 7.6919E+02 | −2.2556E+02 |
| S4 | −1.0476E+02 | 1.0061E+02 | −4.6554E+01 | 7.8041E+00 |
| S5 | 8.0878E+00 | −5.3068E+00 | 1.9092E+00 | −2.8297E−01 |
| S6 | −1.5163E+02 | 1.1667E+02 | −4.8690E+01 | 8.4867E+00 |
| S7 | 1.2408E+02 | −1.5043E+02 | 9.5195E+01 | −2.4510E+01 |
| S8 | −5.9955E+02 | 6.5802E+02 | −4.0142E+02 | 1.0417E+02 |
| S9 | −4.0615E+02 | 3.6815E+02 | −1.8596E+02 | 3.9829E+01 |

TABLE 17-continued

| | | | | |
|---|---|---|---|---|
| S10 | −1.6984E+00 | 3.7220E−01 | −4.4195E−02 | 2.2034E−03 |
| S11 | −2.4349E+00 | 7.0326E−01 | −1.1222E−01 | 7.5704E−03 |
| S12 | 5.4041E−07 | −1.3600E−08 | 1.6773E−10 | −8.2752E−13 |

TABLE 18

| parameter | f1(mm) | f2(mm) | f3(mm) | f4(mm) | f5(mm) | f6(mm) |
|---|---|---|---|---|---|---|
| numerical value | −2.04 | 10.90 | 1.11 | −1.27 | 1.75 | 71.85 |

| parameter | f(mm) | TTL(mm) |
|---|---|---|
| numerical value | 1.05 | 5.34 |

Figure 12A:
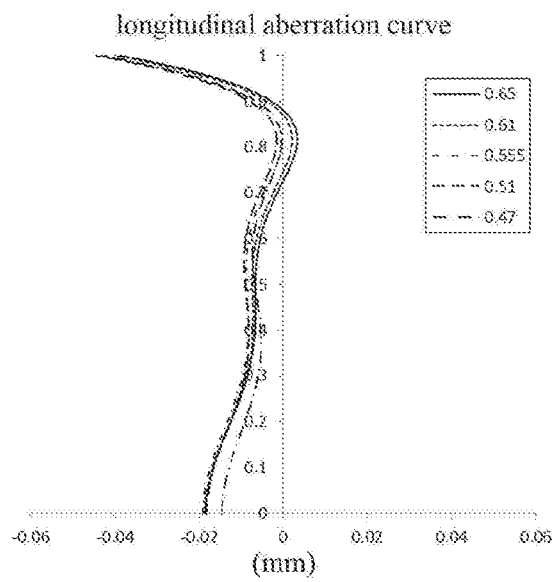
FIGS. 12A-12D respectively illustrate a longitudinal aberration curve, an astigmatic curve, a lateral color curve, and a relative illumination curve of the optical imaging system according to Embodiment 6.
Figure 12B:
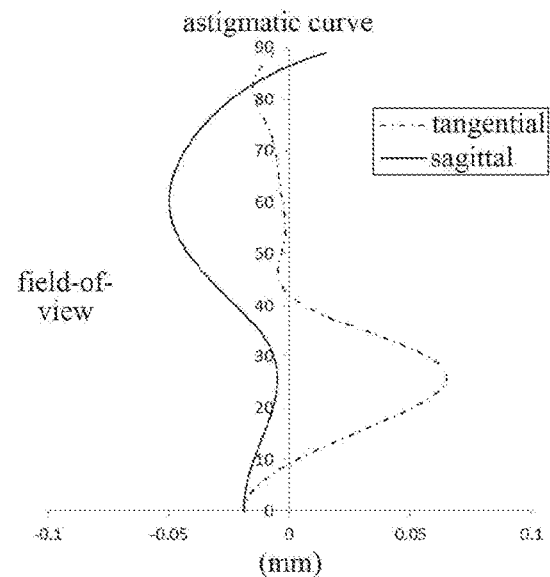
Figure 12C:
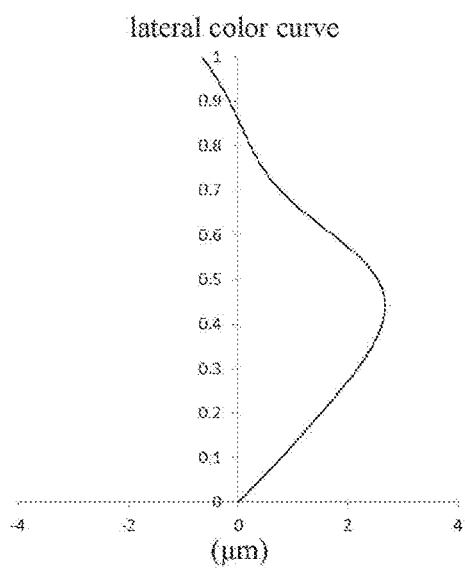
Figure 12D:
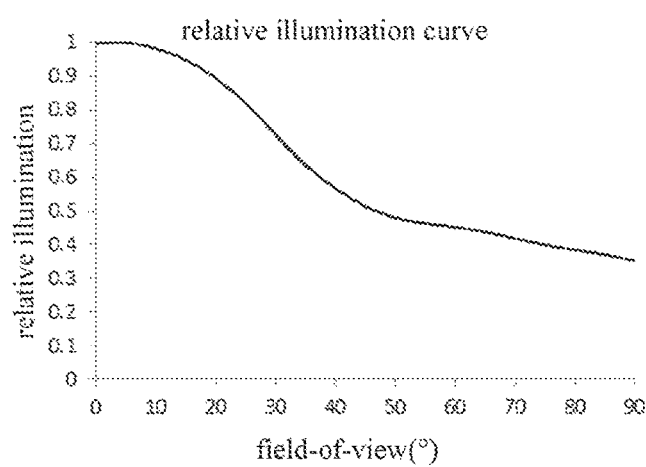

FIG. 12A illustrates the longitudinal aberration curve of the optical imaging system according to Embodiment 6, representing deviations of the focal points of the light of different wavelengths converged after passing through the optical system. FIG. 12B illustrates the astigmatic curve of the optical imaging system according to Embodiment 6, representing a curvature of the tangential image plane and a curvature of the sagittal image plane. FIG. 12C illustrates the lateral color curve of the optical imaging system according to Embodiment 6, representing deviations of different image heights on the image plane after light passes through the optical imaging system. FIG. 12D illustrates the relative illumination curve of the optical imaging system according to Embodiment 6, representing relative illuminations corresponding to different image heights on the image plane. It can be seen from FIGS. 12A-12D that the optical imaging system according to Embodiment 6 can achieve a good imaging quality.

Embodiment 7

An optical imaging system according to Embodiment 7 of the present disclosure is described below with reference to FIGS. 13-14D. FIG. 13 is a schematic structural diagram illustrating the optical imaging system according to Embodiment 7 of the present disclosure.

As shown in FIG. 13, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 19 shows the surface type, the radius of curvature, the thickness, the material and the conic coefficient of each lens of the optical imaging system in Embodiment 7, where the radius of curvature and the thickness are both shown in millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f6 of the lenses of the optical imaging system in Embodiment 7, the total effective focal length f of the optical imaging system, and the total track length TTL of the optical imaging system.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | spherical | 8.5914 | 0.4500 | 1.59 | 58.3 | 0.0000 |
| S2 | spherical | 0.9008 | 0.7104 | | | 0.0000 |
| S3 | aspheric | −8.6156 | 1.0000 | 1.67 | 20.4 | −81.6476 |
| S4 | aspheric | −4.1145 | 0.0513 | | | −1.0055 |
| STO | spherical | infinite | 0.1150 | | | |
| S5 | aspheric | 1.2006 | 0.5829 | 1.55 | 56.1 | −2.0988 |
| S6 | aspheric | −0.9736 | 0.0300 | | | −1.5588 |
| S7 | aspheric | −2.3089 | 0.2200 | 1.65 | 23.5 | 4.5562 |
| S8 | aspheric | 1.1434 | 0.0843 | | | −3.1610 |
| S9 | aspheric | 1.7557 | 0.5047 | 1.55 | 56.1 | −8.0801 |
| S10 | aspheric | −5.0624 | 0.4021 | | | 31.9201 |
| S11 | aspheric | 0.9254 | 0.3403 | 1.54 | 55.9 | −5.1927 |
| S12 | aspheric | 0.8792 | 0.5553 | | | −1.0646 |
| S13 | spherical | infinite | 0.1100 | 1.52 | 64.2 | |

TABLE 19-continued

| surface number | surface type | radius of curvature | thickness | material refractive index | abbe number | conic coefficient |
|---|---|---|---|---|---|---|
| S14 | spherical | infinite | 0.2851 | | | |
| S15 | spherical | infinite | | | | |

TABLE 20

| surface number | A4 | A6 | A8 | A10 | A12 |
|---|---|---|---|---|---|
| S3 | −1.5441E−01 | 2.8496E−01 | −2.7220E+00 | 1.5158E+01 | −5.2058E+01 |
| S4 | −3.1313E−01 | −1.1324E+00 | 4.5353E+01 | −5.9206E+02 | 4.5819E+03 |
| S5 | −3.0194E−01 | 9.7125E−01 | −4.5104E+00 | 3.0534E+01 | −1.6842E+02 |
| S6 | 1.0562E+00 | −2.0817E+01 | 1.9571E+02 | −1.1615E+03 | 4.5977E+03 |
| S7 | 8.3253E−01 | −2.0310E+01 | 1.8564E+02 | −1.0265E+03 | 3.7583E+03 |
| S8 | −3.9452E−01 | 2.1001E−01 | 4.7414E+00 | −8.9018E+00 | −5.3153E+01 |
| S9 | −6.7929E−01 | 4.4959E+00 | −2.7563E+01 | 1.3601E+02 | −4.6128E+02 |
| S10 | −7.6844E−01 | 2.2218E+00 | −3.5255E+00 | −5.0936E+00 | 5.2811E+01 |
| S11 | −2.4723E−01 | −5.3968E−01 | 1.9358E+00 | −2.6476E+00 | 1.5893E+00 |
| S12 | −5.9527E−01 | 7.8865E−02 | 1.3707E+00 | −3.2811E+00 | 4.2361E+00 |

| surface number | A14 | A16 | A18 | A20 |
|---|---|---|---|---|
| S3 | 1.1227E+02 | −1.4721E+02 | 1.0720E+02 | −3.3189E+01 |
| S4 | −2.1927E+04 | 6.3593E+04 | −1.0241E+05 | 7.0311E+04 |
| S5 | 6.1467E+02 | −1.3648E+03 | 1.6726E+03 | −8.5142E+02 |
| S6 | −1.2127E+04 | 2.0489E+04 | −2.0071E+04 | 8.6953E+03 |
| S7 | −9.1879E+03 | 1.4446E+04 | −1.3225E+04 | 5.3751E+03 |
| S8 | 3.0177E+02 | −6.5469E+02 | 6.8427E+02 | −2.8518E+02 |
| S9 | 1.0322E+03 | −1.4427E+03 | 1.1334E+03 | −3.8122E+02 |
| S10 | −1.5093E+02 | 2.2453E+02 | −1.7196E+02 | 5.3060E+01 |
| S11 | 3.8603E−01 | −1.3256E+00 | 8.5576E−01 | −1.9836E−01 |
| S12 | −3.4033E+00 | 1.6824E+00 | −4.6663E−01 | 5.5295E−02 |

TABLE 21

| parameter | f1(mm) | f2(mm) | f3(mm) | f4(mm) | f5(mm) | f6(mm) |
|---|---|---|---|---|---|---|
| numerical value | −1.73 | 10.87 | 1.09 | −1.16 | 2.45 | 20.88 |

| parameter | f(mm) | TTL(mm) |
|---|---|---|
| numerical value | 1.18 | 5.44 |

Figure 14C:
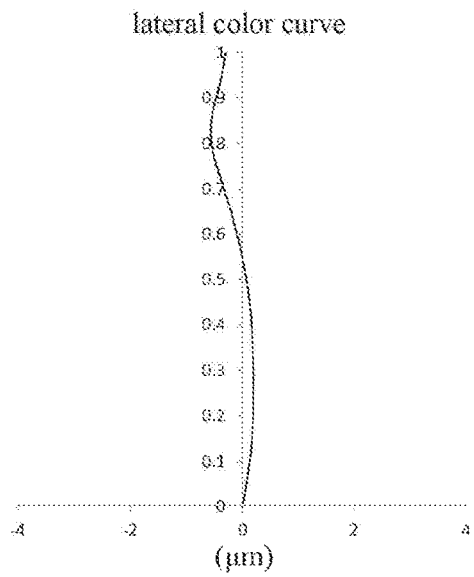
Figure 14D:
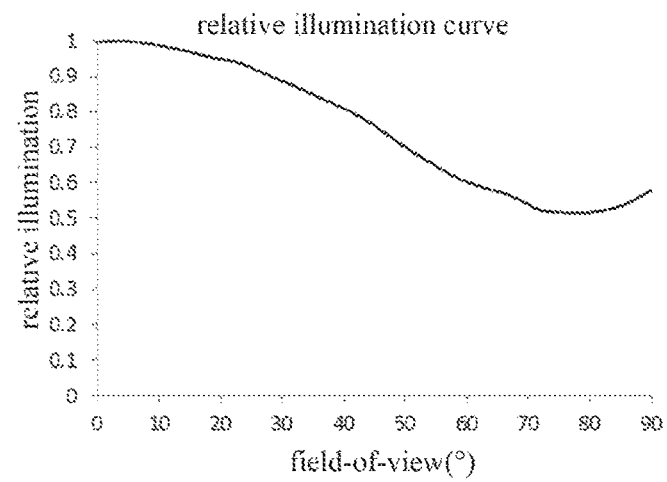

FIG. 14A illustrates the longitudinal aberration curve of the optical imaging system according to Embodiment 7, representing deviations of the focal points of the light of different wavelengths converged after passing through the optical system. FIG. 14B illustrates the astigmatic curve of the optical imaging system according to Embodiment 7, representing a curvature of the tangential image plane and a curvature of the sagittal image plane. FIG. 14C illustrates the lateral color curve of the optical imaging system according to Embodiment 7, representing deviations of different image heights on the image plane after light passes through the optical imaging system. FIG. 14D illustrates the relative illumination curve of the optical imaging system according to Embodiment 7, representing relative illuminations corresponding to different image heights on the image plane. It can be seen from FIGS. 14A-14D that the optical imaging system according to Embodiment 7 can achieve a good imaging quality.

Embodiment 8

Figure 15:
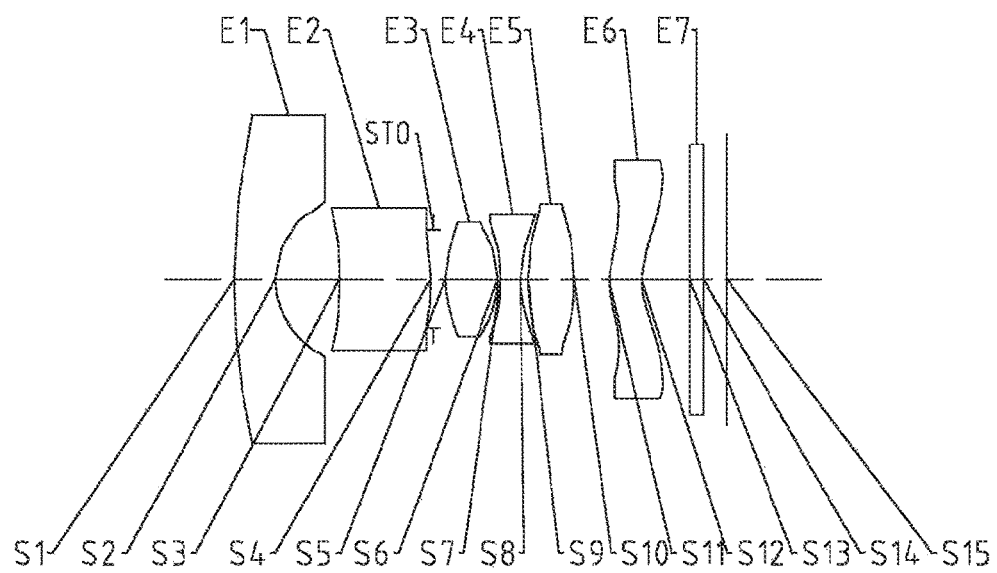
FIG. 15 is a schematic structural diagram illustrating an optical imaging system according to Embodiment 8 of the present disclosure.

An optical imaging system according to Embodiment 8 of the present disclosure is described below with reference to FIGS. 15-16D. FIG. 15 is a schematic structural diagram illustrating the optical imaging system according to Embodiment 8 of the present disclosure.

As shown in FIG. 15, the optical imaging system includes, sequentially along an optical axis from an object side to an image side, a first lens E1, a second lens E2, a third lens E3, a fourth lens E4, a fifth lens E5, a sixth lens E6, and an image plane S15.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both spherical surfaces.

The second lens E2 has a positive refractive power, an object-side surface S3 of the second lens E2 is a concave surface, and an image-side surface S4 of the second lens E2 is a convex surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging system may further include an optical filter E7 having an object-side surface S13 and an image-side surface S14. Light from an object sequentially passes through the surfaces S1-S14 and finally forms an image on the image plane S15.

In the optical imaging system of this embodiment, a diaphragm STO for limiting light beams may also be disposed between, for example, the second lens E2 and the third lens E3, to improve the image quality of the optical imaging system.

Table 22 shows the surface type, the radius of curvature, the thickness, the material and the conic coefficient of each lens of the optical imaging system in Embodiment 8, where the radius of curvature and the thickness are both shown in millimeters (mm). Table 23 shows the high-order coefficients applicable to each aspheric surface in Embodiment 8. The surface type of each aspheric surface may be defined by the formula (1) given in Embodiment 1. Table 24 shows the effective focal lengths f1-f6 of the lenses of the optical imaging system in Embodiment 8, the total effective focal length f of the optical imaging system, and the total track length TTL of the optical imaging system.

TABLE 22

| surface number | surface type | radius of curvature | thickness | refractive index | abbe number | conic coefficient |
|---|---|---|---|---|---|---|
| OBJ | spherical | infinite | infinite | | | |
| S1 | spherical | 8.5914 | 0.4500 | 1.59 | 58.3 | 0.0000 |
| S2 | spherical | 0.9400 | 0.7035 | | | 0.0000 |
| S3 | aspheric | −8.0728 | 1.0000 | 1.67 | 20.4 | −53.9168 |
| S4 | aspheric | −4.4553 | 0.0327 | | | 2.6285 |
| STO | spherical | infinite | 0.1288 | | | |
| S5 | aspheric | 1.1651 | 0.5817 | 1.55 | 56.1 | −2.2285 |
| S6 | aspheric | −0.9832 | 0.0300 | | | −1.6176 |
| S7 | aspheric | −2.3632 | 0.2200 | 1.65 | 23.5 | 4.4255 |
| S8 | aspheric | 1.1347 | 0.0815 | | | −3.1549 |
| S9 | aspheric | 1.7355 | 0.5063 | 1.55 | 56.1 | −7.1341 |
| S10 | aspheric | −5.0613 | 0.3822 | | | 31.7541 |
| S11 | aspheric | 0.9257 | 0.3580 | 1.54 | 55.9 | −5.6030 |
| S12 | aspheric | 0.8564 | 0.5258 | | | −1.0955 |
| S13 | spherical | infinite | 0.1526 | 1.52 | 64.2 | |
| S14 | spherical | infinite | 0.2555 | | | |
| S15 | spherical | infinite | | | | |

TABLE 23

| surface number | A4 | A6 | A8 | A10 | A12 |
|---|---|---|---|---|---|
| S3 | −1.5918E−01 | 2.8836E−01 | −2.7325E+00 | 1.4854E+01 | −4.9213E+01 |
| S4 | −3.5919E−01 | −3.4873E−01 | 3.0268E+01 | −3.9473E+02 | 2.9508E+03 |
| S5 | −3.1217E−01 | 9.9000E−01 | −4.4514E+00 | 3.1538E+01 | −1.8405E+02 |
| S6 | 1.0597E+00 | −2.0461E+01 | 1.9097E+02 | −1.1312E+03 | 4.4826E+03 |
| S7 | 7.9566E−01 | −1.9651E+01 | 1.7936E+02 | −9.8665E+02 | 3.5902E+03 |
| S8 | −4.1116E−01 | 1.7073E−01 | 5.9658E+00 | −1.6039E+01 | −3.1252E+01 |
| S9 | −6.5934E−01 | 4.3844E+00 | −2.7657E+01 | 1.4037E+02 | −4.8685E+02 |
| S10 | −7.7501E−01 | 2.0958E+00 | −1.8308E+00 | −1.5266E+01 | 8.7968E+01 |
| S11 | −2.5321E−01 | −7.4685E−01 | 2.5727E+00 | −3.7881E+00 | 2.8476E+00 |
| S12 | −6.2951E−01 | 7.1374E−02 | 1.5324E+00 | −3.6715E+00 | 4.7435E+00 |

| surface number | A14 | A16 | A18 | A20 |
|---|---|---|---|---|
| S3 | 1.0160E+02 | −1.2677E+02 | 8.7412E+01 | −2.5524E+01 |
| S4 | −1.3490E+04 | 3.7153E+04 | −5.6584E+04 | 3.6637E+04 |
| S5 | 6.9557E+02 | −1.5708E+03 | 1.9322E+03 | −9.8005E+02 |
| S6 | −1.1857E+04 | 2.0110E+04 | −1.9786E+04 | 8.6098E+03 |
| S7 | −8.7233E+03 | 1.3635E+04 | −1.2413E+04 | 5.0196E+03 |
| S8 | 2.6325E+02 | −6.1933E+02 | 6.7344E+02 | −2.8823E+02 |
| S9 | 1.1080E+03 | −1.5687E+03 | 1.2454E+03 | −4.2294E+02 |
| S10 | −2.2461E+02 | 3.1626E+02 | −2.3342E+02 | 6.9816E+01 |
| S11 | −3.3044E−01 | −1.3088E+00 | 1.0667E+00 | −2.8097E−01 |
| S12 | −3.8026E+00 | 1.8719E+00 | −5.1646E−01 | 6.0864E−02 |

TABLE 24

| parameter | f1(mm) | f2(mm) | f3(mm) | f4(mm) | f5(mm) | f6(mm) |
|---|---|---|---|---|---|---|
| numerical value | −1.82 | 13.45 | 1.08 | −1.16 | 2.43 | 26.53 |

| parameter | f(mm) | TTL(mm) |
|---|---|---|
| numerical value | 1.19 | 5.41 |

Figure 16A:
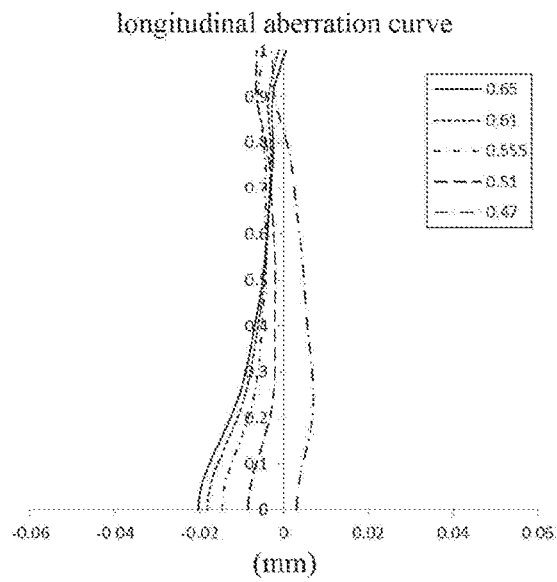
FIGS. 16A-16D respectively illustrate a longitudinal aberration curve, an astigmatic curve, a lateral color curve, and a relative illumination curve of the optical imaging system according to Embodiment 8.
Figure 16B:
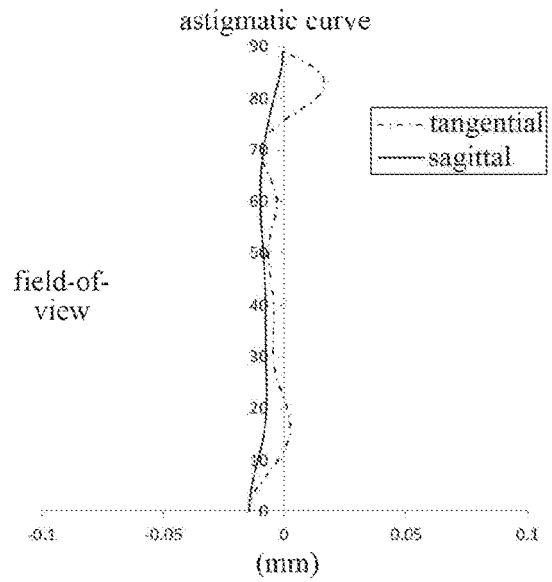
Figure 16C:
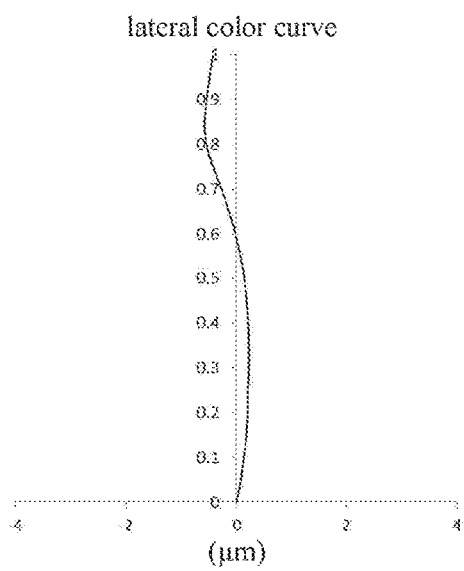
Figure 16D:
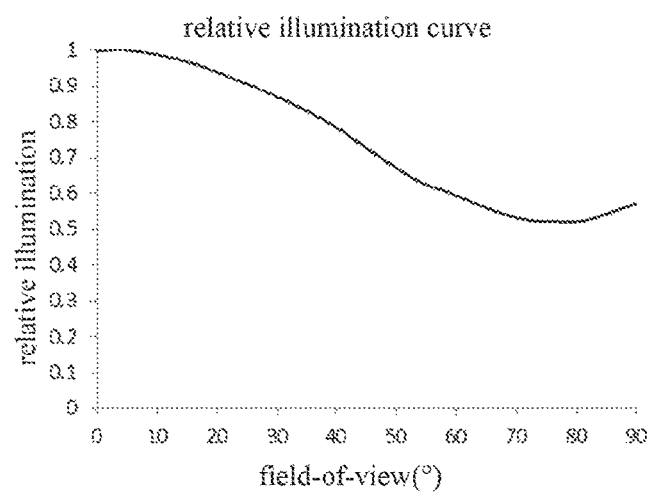

FIG. 16A illustrates the longitudinal aberration curve of the optical imaging system according to Embodiment 8, representing deviations of the focal points of the light of different wavelengths converged after passing through the optical system. FIG. 16B illustrates the astigmatic curve of the optical imaging system according to Embodiment 8, representing a curvature of the tangential image plane and a curvature of the sagittal image plane. FIG. 16C illustrates the lateral color curve of the optical imaging system according to Embodiment 8, representing deviations of different image heights on the image plane after light passes through the optical imaging system. FIG. 16D illustrates the relative illumination curve of the optical imaging system according to Embodiment 8, representing relative illuminations corresponding to different image heights on the image plane. It can be seen from FIGS. 16A-16D that the optical imaging system according to Embodiment 8 can achieve a good imaging quality.

To sum up, Embodiments 1-8 respectively satisfy the relationships shown in Table 25 below.

TABLE 25

| Conditional Expression | Embodiment | | | | | | | |
|---|---|---|---|---|---|---|---|---|
| | 1 | 2 | 3 | 4 | 5 | 6 | 7 | 8 |
| Tan(HFOV/2) | 0.99 | 0.99 | 1.00 | 1.00 | 1.00 | 1.00 | 1.00 | 1.00 |
| f3/f5 | 0.44 | 0.57 | 0.44 | 0.36 | 0.60 | 0.63 | 0.44 | 0.44 |
| f/f345 | 0.64 | 0.68 | 0.74 | 0.58 | 0.78 | 0.68 | 0.67 | 0.69 |
| f/f2 | 0.15 | 0.10 | 0.08 | 0.07 | 0.12 | 0.10 | 0.11 | 0.09 |
| f/f4 | −0.97 | −0.85 | −1.04 | −1.36 | −0.97 | −0.83 | −1.02 | −1.02 |
| |f1/f6| | 0.21 | 0.05 | 0.07 | 0.40 | 0.38 | 0.03 | 0.08 | 0.07 |
| ET6/CT6 | 1.18 | 1.16 | 1.41 | 1.21 | 1.67 | 1.35 | 1.37 | 1.39 |
| |SAG61|/CT6 | 0.74 | 0.17 | 0.02 | 0.24 | 0.27 | 0.63 | 0.31 | 0.17 |
| CT6/CT1 | 0.60 | 0.57 | 0.85 | 0.73 | 0.60 | 0.55 | 0.76 | 0.80 |
| T56/Σ AT | 0.29 | 0.13 | 0.29 | 0.23 | 0.31 | 0.27 | 0.29 | 0.28 |
| f/|R3| | 0.14 | 0.15 | 0.18 | 0.21 | 0.17 | 0.11 | 0.14 | 0.15 |
| R7/R8 | −2.03 | −2.84 | −2.26 | −0.85 | −3.54 | −2.49 | −2.02 | −2.08 |
| f/EPD | 2.1 | 2.1 | 2.2 | 2.2 | 2.2 | 1.8 | 2.1 | 2.0 |

The present disclosure further provides an imaging device, having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system comprising, sequentially along an optical axis from an object side to an image side, a first lens, a second lens, a third lens, a fourth lens, a fifth lens, and a sixth lens,
   wherein each of the first lens and the fourth lens has a negative refractive power;
   each of the second lens and the sixth lens has a positive refractive power or a negative refractive power; and
   an effective focal length f3 of the third lens and an effective focal length f5 of the fifth lens satisfy: 0<f3/f5<0.8, and
   half of a maximal field-of-view HFOV of the optical imaging system satisfies:

Tan(HFOV/2)>0.9.

2. The optical imaging system according to claim 1, wherein a total effective focal length f of the optical imaging system and an effective focal length f2 of the second lens satisfy:

f/f2<0.2.

3. The optical imaging system according to claim 1, wherein a total effective focal length f of the optical imaging system and an effective focal length f4 of the fourth lens satisfy:

−1.5<f/f4<−0.5.

4. The optical imaging system according to claim 1, wherein an effective focal length f1 of the first lens and an effective focal length f6 of the sixth lens satisfy:

|f1/f6|<0.5.

5. The optical imaging system according to claim 1, wherein an edge thickness ET6 of the sixth lens at a maximum radius and a center thickness CT6 of the sixth lens on the optical axis satisfy:

1<ET6/CT6<2.

6. The optical imaging system according to claim 1, wherein a center thickness CT6 of the sixth lens on the optical axis and a center thickness CT1 of the first lens on the optical axis satisfy:

0.5<CT6/CT1<1.0.

7. The optical imaging system according to claim 1, wherein the total effective focal length f of the optical imaging system and an entrance pupil diameter EPD of the optical imaging system satisfy:

f/EPD<2.2.

8. An optical imaging system, having a total effective focal length f, the optical imaging system comprising, sequentially along an optical axis from an object side to an image side, a first lens, a second lens, a third lens, a fourth lens, a fifth lens, and a sixth lens,
   wherein the first lens has a negative refractive power;
   each of the second lens and the sixth lens has a positive refractive power or a negative refractive power; and
   a combined refractive power of the third lens, the fourth lens and the fifth lens is a positive refractive power, wherein at least one of the third lens, the fourth lens or the fifth lens has a negative refractive power, and a combined focal length f345 of the third lens, the fourth lens, and the fifth lens satisfies:

$0.5 < f/f345 < 0.9$, and half of a maximal field-of-view HFOV of the optical imaging system satisfies:

$Tan(HFOV/2) > 0.9$.

9. The optical imaging system according to claim 8, wherein an effective focal length f1 of the first lens and an effective focal length f6 of the sixth lens satisfy:

$|f1/f6| < 0.5$.

10. The optical imaging system according to claim 8, wherein the total effective focal length f of the optical imaging system and an effective focal length f2 of the second lens satisfy:

$f/f2 < 0.2$.

11. The optical imaging system according to claim 8, satisfying $0.1 < T56/\Sigma AT < 0.5$, wherein T56 is an air spacing on the optical axis between the fifth lens and the sixth lens, and $\Sigma AT$ is a sum of spacing distances on the optical axis between any two adjacent lenses from the first lens to the sixth lens.

12. The optical imaging system according to claim 8, wherein the total effective focal length f of the optical imaging system and a radius of curvature R3 of an object-side surface of the second lens satisfy:

$f/|R3| < 0.3$.

13. An optical imaging system comprising, sequentially along an optical axis from an object side to an image side, a first lens, a second lens, a third lens, a fourth lens, a fifth lens, and a sixth lens, the six lenses having refractive powers, wherein each of the first lens and the fourth lens has a negative refractive power;

each of the third lens and the fifth lens has a positive refractive power;

at least one of the second lens or the sixth lens has a positive refractive power; and a sagittal height SAG61 of an object-side surface of the sixth lens at a maximum radius and a center thickness CT6 of the sixth lens on the optical axis satisfy:

$|SAG61|/CT6 < 1$.

14. The optical imaging system according to claim 13, wherein half of a maximal field-of-view HFOV of the optical imaging system satisfies:

$Tan(HFOV/2) > 0.9$.

15. The optical imaging system according to claim 13, wherein a total effective focal length f of the optical imaging system and an effective focal length f4 of the fourth lens satisfy:

$-1.5 < f/f4 < -0.5$.

16. The optical imaging system according to claim 15, wherein a radius of curvature R7 of an object-side surface of the fourth lens and a radius of curvature R8 of an image-side surface of the fourth lens satisfy:

$-5.0 < R7/R8 < 0$.

17. The optical imaging system according to claim 13, wherein the total effective focal length f of the optical imaging system and an effective focal length f2 of the second lens satisfy:

$f/f2 < 0.2$.

18. The optical imaging system according to claim 13, wherein an effective focal length f1 of the first lens and an effective focal length f6 of the sixth lens satisfy:

$|f1/f6| < 0.5$.

* * * * *